United States Patent
Ben-Shaul et al.

(10) Patent No.: US 8,626,723 B2
(45) Date of Patent: Jan. 7, 2014

(54) STORAGE-NETWORK DE-DUPLICATION

(75) Inventors: Israel Zvi Ben-Shaul, Palo Alto, CA (US); Leonid Vasetsky, Zikhron Yaakov (IL)

(73) Assignee: VMware, Inc., Palo Alto, CA (US)

( * ) Notice: Subject to any disclaimer, the term of this patent is extended or adjusted under 35 U.S.C. 154(b) by 258 days.

(21) Appl. No.: 12/578,485

(22) Filed: Oct. 13, 2009

(65) Prior Publication Data

US 2010/0094817 A1    Apr. 15, 2010

Related U.S. Application Data

(60) Provisional application No. 61/105,365, filed on Oct. 14, 2008.

(51) Int. Cl.
*G06F 17/30* (2006.01)

(52) U.S. Cl.
USPC .......................................................... 707/692

(58) Field of Classification Search
USPC ........................................ 707/650, 821, 692
See application file for complete search history.

(56) References Cited

U.S. PATENT DOCUMENTS

| | | | |
|---|---|---|---|
| 6,389,433 B1 | 5/2002 | Bolosky | |
| 6,477,544 B1 | 11/2002 | Bolosky | |
| 7,047,482 B1 | 5/2006 | Odom | |
| 7,080,051 B1 | 7/2006 | Crawford | |
| 7,567,188 B1 * | 7/2009 | Anglin et al. | 341/63 |
| 7,716,307 B1 | 5/2010 | Ben-Shaul et al. | |
| 7,734,820 B1 | 6/2010 | Ranade et al. | |
| 7,814,149 B1 * | 10/2010 | Stringham | 709/203 |
| 7,953,833 B2 | 5/2011 | Ben-Shaul et al. | |
| 8,234,359 B2 | 7/2012 | Bestmann | |
| 8,239,662 B1 | 8/2012 | Nelson | |
| 8,239,667 B2 | 8/2012 | Durham | |
| 8,250,352 B2 | 8/2012 | Filali-Abid et al. | |
| 8,301,874 B1 | 10/2012 | Heidingsfeld et al. | |
| 8,316,123 B2 | 11/2012 | Sethuraman et al. | |
| 2002/0010798 A1 | 1/2002 | Ben-Shaul et al. | |
| 2003/0126242 A1 | 7/2003 | Chang | |
| 2003/0182436 A1 | 9/2003 | Henry | |

(Continued)

OTHER PUBLICATIONS

Yang et al., "FBBM: A new Backup Method with Data De-duplication Capability", Issue Date: Apr. 24-26, 2008, 2008 International Conference on Multimedia and Ubiquitous Engineering, pp. 30-35, IEEE Digital Library.*

(Continued)

*Primary Examiner* — Rehana Perveen
*Assistant Examiner* — Alexander Khong

(57) ABSTRACT

Techniques are provided for de-duplication of data. In one embodiment, a system comprises de-duplication logic that is coupled to a de-duplication repository. The de-duplication logic is operable to receive, from a client device over a network, a request to store a file in the de-duplicated repository using a single storage encoding. The request includes a file identifier and a set of signatures that identify a set of chunks from the file. The de-duplication logic determines whether any chunks in the set are missing from the de-duplicated repository and requests the missing chunks from the client device. Then, for each missing chunk, the de-duplication logic stores in the de-duplicated repository that chunk and a signature representing that chunk. The de-duplication logic also stores, in the de-duplicated repository, a file entry that represents the file and that associates the set of signatures with the file identifier.

33 Claims, 11 Drawing Sheets

(56) References Cited

U.S. PATENT DOCUMENTS

| | | | |
|---|---|---|---|
| 2006/0282457 A1* | 12/2006 | Williams | 707/102 |
| 2008/0184336 A1 | 7/2008 | Sarukkai et al. | |
| 2008/0243957 A1 | 10/2008 | Prahlad et al. | |
| 2008/0281884 A1 | 11/2008 | Subrahmanyam | |
| 2009/0106255 A1 | 4/2009 | Lacapra et al. | |
| 2009/0142055 A1 | 6/2009 | Qiu et al. | |
| 2009/0198805 A1 | 8/2009 | Ben-Shaul et al. | |
| 2009/0234892 A1* | 9/2009 | Anglin et al. | 707/201 |
| 2009/0271454 A1* | 10/2009 | Anglin et al. | 707/204 |
| 2010/0023995 A1 | 1/2010 | Kim | |
| 2010/0042626 A1 | 2/2010 | Verma et al. | |
| 2010/0070478 A1* | 3/2010 | Anglin | 707/674 |

OTHER PUBLICATIONS

PCT/US2009/060554 International Search Report, Feb. 23, 2010, Wanova Technologies, Ltd.

PCT/US2009/060554 Written Opinion of International Searching Authority, Feb. 23, 2010, Wanova Technologies, Ltd.

PCT/US2009/060554 Current Claims, International Filling Date Oct. 13, 2009, Wanova Technologies, Ltd.

Tolia, N. et al., "Opportunistic Use of Content Addressable Storage for Distributed File Systems", Proceedings of the USENIX Annual Technical Conference, pp. 127-140, Jun. 9, 2003, San Antonio, TX, XP 009068169.

Muthitacharoen, A. et al., "A Low-bandwidth Network File System", ACM SOSP, Proceedings of the 18$^{th}$ ACM Symposium on Operating Systems Principles, pp. 174-187, Oct. 21, 2002, Baniff, Alberta, Canada, XP 002405303.

KyoungSoo, P. et al., "Supporting Practical Content-Addressable Caching with CZIP Compression", 2007 USENIX Annual Technical Conference, pp. 185-198, Oct. 21, 2002, Berkeley, CA, XP 002568537.

U.S. Appl. No. 12/723,572, filed Mar. 12, 2010, Office Action, May 22, 2012.

U.S. Appl. No. 13/627,456, filed Sep. 26, 2012 entitled "Atomic Switching of Images in Desktop Streaming Over Wide Area Networks".

\* cited by examiner

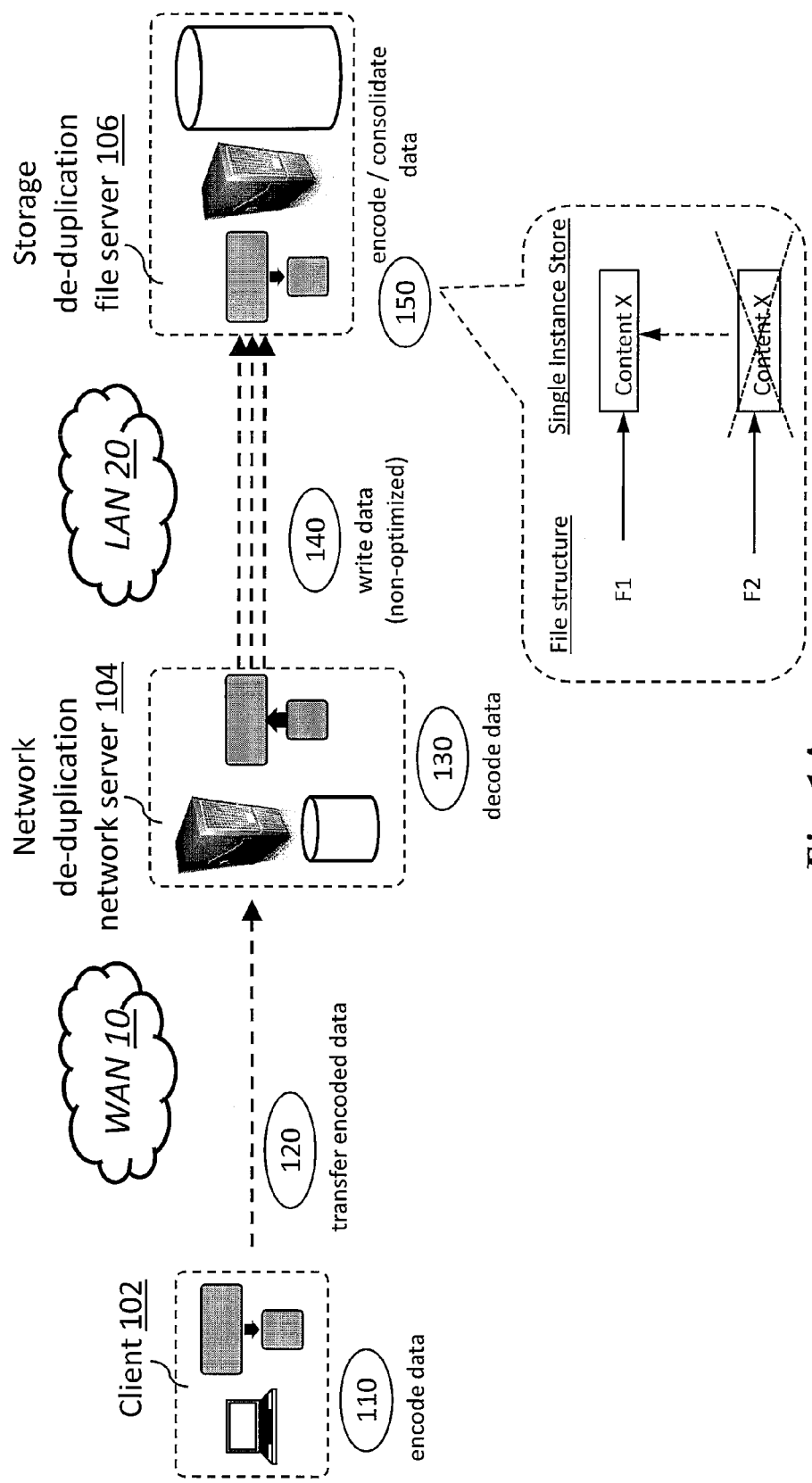

STORAGE-NETWORK DE-DUPLICATION

PRIORITY CLAIM

This application claims benefit and priority under 35 U.S.C. §119(e) to U.S. Provisional Patent Application Ser. No. 61/105,365, filed on Oct. 14, 2008 and titled "STORAGE-NETWORK DE-DUPLICATION", the entire contents of which is hereby incorporated by reference as if fully set forth herein.

TECHNICAL FIELD

This disclosure relates generally to storing and transmitting data in a distributed system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

De-duplication of data generally involves eliminating redundant copies of data items. According to one approach, storage de-duplication provides an encoding for a file system. The encoding is such that identical data blocks, which appear in multiple files in the file system, are stored only once physically in a disk repository and are pointed to by the various files' metadata structures. For example, instead of storing data blocks, a file in the encoded file system may store references to data blocks, some of which may be shared with other files, where each data bock is associated with a reference count.

According to another approach for de-duplication of data, network de-duplication reduces the amount of traffic being sent over a network by eliminating the transfer of data blocks that have been already been sent in the past. By doing so, the network de-duplication approach may achieve two objectives—bandwidth savings and faster transfer (assuming that the processing time to de-duplicate data blocks does not outweigh the time savings due to transfer of less data).

While network de-duplication and storage de-duplication bear some similarities, they have different and conflicting motivations. Storage de-duplication aims at optimizing storage utilization and trades it off with overhead in performance. In contrast, network de-duplication aims at optimizing network performance and trades it off with overhead in storage. Thus, the objectives and trade-offs of the network de-duplication approach and the storage de-duplication approach are directly opposite to and conflicting with each other.

BRIEF DESCRIPTION OF THE DRAWINGS

In the figures of the accompanying drawings like reference numerals refer to similar elements.

FIG. 1A is a block diagram that illustrates upload of data in a possible approach that implements network de-duplication and storage de-duplication side by side.

DETAILED DESCRIPTION

Figure 1B:
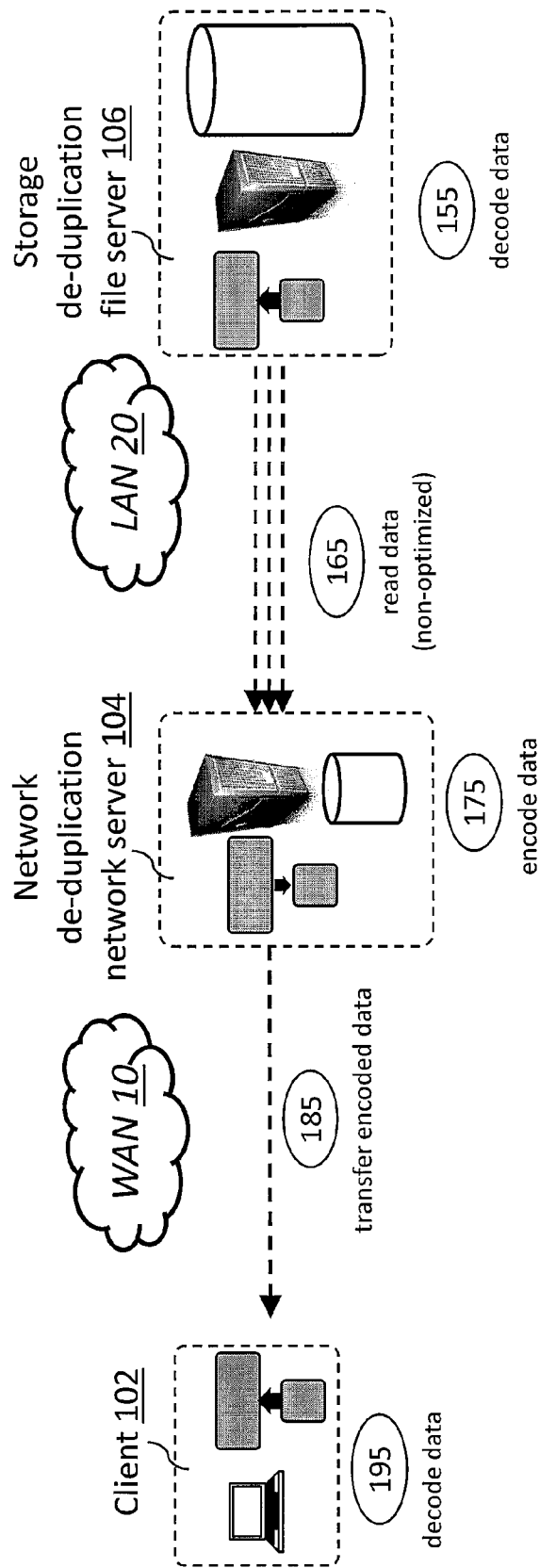
FIG. 1B is a block diagram that illustrates download of data in a possible approach that implements network de-duplication and storage de-duplication side by side.

Techniques are provided for de-duplication of data. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Side by Side Implementation of Storage De-duplication and Network De-duplication
3.0 Storage-Network De-duplication
   3.1 Challenges in Implementing Storage-Network De-duplication
   3.2 Solutions to the Challenges in Implementing Storage-Network De-duplication
4.0 Example Embodiments and Features of Storage-Network De-duplication Systems
   4.1 De-duplicated Repository
   4.2 Examples of End-to-End Data Transfer Logic
   4.3 Examples of Signature Calculations
   4.4 Disk Considerations and Optimizations
   4.5 Metadata De-duplication
   4.6 On-the-fly Computation of File-Level Signatures
5.0 Implementation Mechanisms—Hardware Overview
6.0 Extensions and Alternatives

1.0 General Overview

Techniques are described herein for de-duplication of data. The techniques described herein provide a data de-duplication mechanism (also referred to hereinafter as "storage-network de-duplication") that is used both for storing files and/or portions thereof in a repository and for transferring files and/or the portions thereof from the repository across a network. Thus, the data de-duplication mechanism described herein provides for both efficient storage utilization and efficient network performance.

The techniques described herein provide for storing files in accordance with a single, unified storage encoding that is used for both: (1) storing data in a de-duplicated storage repository; and (2) transferring the stored data from the de-duplicated repository to receivers across one or more networks without additional encoding and transformation of the data. As used herein, "chunk" (also referred to hereinafter as "data chunk") refers to a set of data that is a continuous portion of a file. "De-duplicated repository" (also referred to hereinafter as "de-duplicated data repository") refers to a repository of file system objects (e.g., files and directories) and multiple chunks, where the repository stores a single copy of each unique chunk and maintains references or pointers to the single copy of a unique chunk from the encoded file system objects that contain that chunk. A de-duplicated repository may also store some additional metadata information for each file system object stored therein (e.g., permissions, Access Control List (ACL), etc.) and for each unique chunk (e.g., a signature and a reference count). The organization of the metadata information that describes the file system objects and how the chunks of a file are stored in the de-duplicated repository is referred to herein as "storage encoding".

In one embodiment, a system comprises de-duplication logic that is coupled to a de-duplication repository and one or more processors that are coupled to the de-duplication logic. The de-duplication logic is operable to receive, from a client device over a network, a request to store a file in the de-duplicated repository using a single storage encoding. The request includes an identifier of the file and a set of signatures that respectively identify a set of chunks from the file. The de-duplication logic is further operable to look up the set of signatures in the de-duplicated repository to determine whether any chunks in the set of chunks are not stored in the de-duplicated repository. Further, the de-duplication logic is operable to request, from the client device, those chunks from the set of chunks that are not stored in the de-duplicated repository. Then, for each chunk from the set of chunks that is not stored in the de-duplicated repository, the de-duplication logic is operable to store in the de-duplicated repository at least the chunk and a signature, from the set of signatures, that represents the chunk. The de-duplication logic is also operable to store, in the de-duplicated repository, a file entry that represents the file and that associates the set of signatures with the identifier of the file.

In this embodiment, the system may comprise additional features in accordance with the data de-duplication techniques described herein. For example, the de-duplication logic may be further operable to: receive a request from a client device to download the file, where the request includes the identifier of the file; look up the identifier of the file in the de-duplicated repository to determine the file entry; based on the file entry, retrieve the set of signatures that are associated with the identifier of the file, but not data from the file; and in response to the download request, send the set of signatures but not the file to the client device over the network. The de-duplication logic may be further operable to: after the download request, receive a request from the client device over the network, where the request includes one or more signatures that respectively identify one or more chunks that are not stored at the client device; look up the one or more signatures in the de-duplicated repository to determine the one or more chunks identified in the request; and send the one or more chunks to the client device over the network.

In another example of a system feature, the de-duplication logic is further operable to increment reference counts that are respectively associated with those chunks, from the set of chunks of the file, that were already stored in the de-duplicated repository. According to this feature, the de-duplication logic is further operable to initialize reference counts that are respectively associated with those chunks, from the set of chunks, that were not previously stored in the de-duplicated repository.

In an example of a system feature, the set of chunks from the file have varying lengths and are generated from the file by using a fingerprinting logic that determines chunk boundaries based on the content of the file. The fingerprinting logic is typically executed to determine chunk boundaries in the file at the location where the file is processed for the very first time—thus, the location can be either at the client device or at the system that includes the de-duplicated repository. According to this feature, the de-duplicated repository is stored on physical disk blocks that have a certain fixed size, and the fingerprinting logic is configured to generate chunks that are up to, but not more than, the certain fixed size.

In another example of a system feature, the de-duplicated repository comprises a file system structure and a store structure, where the file system structure is configured to store the file identifier and the file entry that associates the set of chunk signatures with the file identifier, and the store structure is configured to store the set of chunk signatures and the set of corresponding chunks. In accordance with this feature, the store structure is organized into a plurality of hierarchical levels, where signatures at each of the hierarchical levels are keyed based on a subset of the signatures' bits, and the de-duplication logic may further expose a programming interface that is operable to look up signatures directly in the store structure to find corresponding chunks. Further, in accordance with this feature, the de-duplication logic is further operable to store in the de-duplicated repository metadata information for the file (e.g., permissions, ACLs, etc.) by using the same single storage encoding that is used to store files and chunks thereof. For example, the de-duplication logic may be operable to: generate one or more metadata chunks for the file by applying a fingerprinting logic to the metadata information associated with the file; compute one or more metadata signatures respectively for the one or more metadata chunks; store, in the store structure of the de-duplicated repository, the one or more metadata chunks and the one or more metadata signatures; and store, in the file entry that represents the file in the file system structure of the de-duplicated repository, data that associates the one or more metadata signatures with the file identifier of the file.

In an example of a system feature, the de-duplication logic is further operable to: receive a request from the client device over the network, where the request includes a list of signatures that identify a plurality of chunks that need to be sent to the client device; based on the list of signatures, determine a list of block identifiers of a plurality of physical disk blocks on which the plurality of chunks are stored; sort the list of block identifiers; and retrieve the plurality of chunks by accessing the plurality of physical disk blocks in the order indicted by the sorted list of block identifiers. In another example of a system feature, the de-duplication logic is operable to determine whether any chunks in the set of chunks are not stored in the de-duplicated repository by looking up the set of signatures in a negative-cache bitmap.

Another example system feature provides for computing file-level signatures for new files as the new files are being stored in the de-duplicated repository for the very first time. For example, in accordance with this feature, the de-duplication logic is operable to: receive a new file for storing into the de-duplicated repository; store the new file in temporary storage; concurrently with storing the new file in the de-duplicated repository using the single storage encoding, compute on-the-fly a file-level signature from the new file as chunks of the new file are being processed for storing in the de-duplicated repository; and after the new file is stored in the de-duplicated repository, store the file-level signature in the de-duplicated repository without accessing the new file in the temporary storage.

In another embodiment, the invention encompasses a storage medium that stores sequences of instructions which, when executed by one or more computing devices, are operable to perform the functionalities of the aforementioned system and/or the features thereof. In yet another embodiment, the invention encompasses a method comprising computer-implemented steps for performing the functionalities of the aforementioned system and/or the features thereof.

2.0 Side by Side Implementation of Storage De-Duplication and Network De-Duplication In general, storage de-duplication mechanisms work as follows. A file system is constructed such that identical file blocks that appear in multiple files are kept only once physically in a block repository on disk, and are pointed to by the various files' metadata information. Thus, a file has references to blocks, some of which are shared, and a reference count is associated with each block. The blocks may be stored in a block repository or database configured to store file blocks. In order to find out quickly whether a given block already exists in the block repository, a storage de-duplication mechanism may compute for each block a signature, or block digest, and store that signature in the block repository. Then, for each new block that needs to be added to the file system, a signature is computed and is looked up in the block repository to see if the block already exists therein. If it does, then the reference count of that block is incremented, and the file entry for the file that includes the block is updated with a reference to that block, thereby saving storage space by not storing that block twice or more in the block repository. Otherwise, if the block does not already exist in the block repository, the block is added to the block repository as a new block.

In general, network de-duplication mechanisms have the goal to reduce the amount of traffic being sent over a network by eliminating the transfer of data that has already been sent in the past. By doing so, two objectives are achieved: bandwidth savings and faster transfer (provided that the processing time to de-duplicate data does not outweigh the time savings due to transfer of less data). Thus, network de-duplication mechanisms are particularly effective for networks with low-bandwidth, since network savings and faster transfer times are easily attainable.

The idea behind network de-duplication benefits from coordination between two entities, the sender endpoint and the receiver endpoint. One method to transfer a file between a sender and a receiver is as follows. When a sender wants to send a stream of data, the sender first breaks the stream into blocks, and generates a signature for each block. The sender then sends the signatures to the receiver. The receiver maintains a cached repository of recently received blocks. Upon receiving a list of signatures from the sender, the receiver looks up each signature in its cached repository. Blocks for which a matching signature is found do not need to be transferred over the network. The receiver then responds to the sender with a subset of signatures for which the receiver needs the actual blocks. The sender then sends these actual blocks that are missing at the receiver, and the receiver stores these new blocks in its cached repository. In the process of storing the new blocks, the receiver may evict some older blocks from the cached repository to make room for the new blocks. The receiver then generates the original data stream from the blocks identified by the list of signatures, and passes the generated data stream to the application that requested that stream.

In one operational context, a distributed system may include a large number of remote client computers whose datasets (e.g., various directories and files) need to be backed up, replicated, or otherwise stored at a central file server that resides in an enterprise data center. A client dataset therefore needs to traverse low-bandwidth Wide Area Network (WAN) connections. Furthermore, in this operational context it can be safely assumed that there is some similarity between some parts of the different clients' datasets (e.g., Operating System (OS) files, files of enterprise-wide software applications such as e-mail, shared documents and presentations, etc). Thus, in this operational context, it is desirable to employ both storage de-duplication and network de-duplication mechanisms in order to attain both the storage utilization benefit of the storage de-duplication and the network performance benefit of the network de-duplication.

One theoretically possible, straightforward approach for this operational context would be to deploy a storage de-duplication mechanism and a network de-duplication mechanism side by side. That is, a network de-duplication server would be placed between the client computers and a file server in the enterprise data center, and the file server would perform storage de-duplication at the enterprise data center. Unfortunately, this side by side approach has some significant drawbacks. The main drawback of this approach is that it incurs the accumulative processing of both the storage de-duplication mechanism and the network de-duplication mechanism, which overall adversely affects the performance of transferring large datasets across the WAN.

FIG. 1A is a block diagram that illustrates upload of data in a side by side approach for implementing network de-duplication and storage de-duplication. FIG. 1B is a block diagram that illustrates download of data in the side by side approach for implementing of network de-duplication and storage de-duplication. The following terminology is used to explain the side by side approach illustrated in FIGS. 1A and 1B:

Client—the remote client that holds a dataset to be synchronized with the file server.

Network server—The server component that performs network de-duplication.

File server—The server component that performs storage de-duplication.

Referring to FIG. 1A, when client 102 wants to store (or upload) a file at remote file server 106, the following operations need to take place:

1. Network-Encode (performed by client 102). Client 102 encodes the file into a list of signatures, as indicated by step 110. In step 120, client 102 transfers the list of signatures to network server 104 over WAN 10.

2. Network-Decode (performed by network server 104). Network server 104 performs network de-duplication by decoding the list of signatures, as indicated by step 130. For example, network server 104 decodes the received list of signatures by looking up the signatures its network repository and by retrieving the corresponding file blocks. Network server 104 then requests from client 102 those file blocks that are missing in the network repository. After receiving the missing file blocks, network server 104 assembles the whole file. Once the whole file is assembled, network server 104 sends or writes the entire contents of the assembled file to file server 106 over Local Area network (LAN) 20, as indicated by step 140.

3. File-Encode (performed by file server 106). File server 106 receives the file from network server 104 and performs storage de-duplication, as indicated by step 150. For example, file server 106 breaks down the file into file blocks and looks up the file blocks in its file system repository. Then, file server 106 adds to the file system repository each file block that is not already stored therein, updates the reference count of each file block that is derived from the file, and creates or updates a file entry for the file to include a reference to each file block that is derived from the file.

This completes the procedure of uploading a file from a client (such as client 102) to file server 106. Notably, during this uploading procedure many file blocks end up being stored twice—once by network sever 104 in the network repository (at least as long as they are needed before possibly being evicted for cache maintenance reasons), and once by file server 106 in the file system repository.

Referring to FIG. 1B, when client 102 wants to download a file from remote file server 106, the following operations need to take place:
1. File-Decode (performed by file server 106). In step 155, file server 106 decodes the requested file in accordance with the storage de-duplication mechanism employed by the file server. For example, file server 106 may decode the requested file by following the references to the file's blocks and reading the blocks' contents in order to generate the whole file in assembled form. File server 106 then sends the whole assembled file to network server 104 over LAN 20, as indicated by step 165.
2. Network-Encode (performed by network-server 104). In step 175, network server 104 encodes the file received from file server 106 in accordance with the network de-duplication mechanism employed by the network server. For example, network server 104 breaks the file into a sequence of blocks and generates a list of signatures that represents the sequence of blocks. Network server 104 then sends the list of signatures to client 102 over WAN 10, as indicated by step 185.
3. Network-Decode (performed by client 102). Client 102 performs network de-duplication by decoding the list of signatures received from network server 104, as indicated by step 195. For example, client 102 decodes the received list of signatures by looking up the signatures its cache repository and retrieving the corresponding file blocks. Client 102 may then request from network server 104 those file blocks that are missing from the client's cache repository. After receiving the missing file blocks, client 102 assembles the whole file.

This completes the procedure of downloading a file from file server 106 to client 102. It is noted that for network de-duplication to work at the client, the client needs to also maintain its own repository of file blocks in order to eliminate transfers of file blocks that have been previously transferred from the network server; thus, the logic for network de-duplication is symmetric for the network server and the client, and relates in general to sender and receiver.

3.0 Storage-Network De-Duplication

In contrast to the above approach of side by side implementation of storage de-duplication and network de-duplication, the techniques for storage-network de-duplication described herein provide substantial improvement in end-to-end performance without adversely affecting the storage utilization.

According to the techniques described herein, there is no need for a separate network server that performs network de-duplication and a separate file server that performs storage de-duplication. Instead, a single de-duplication server performs data de-duplication in accordance with a single, unified storage encoding that is used both for storing data in a de-duplicated repository and for transferring data from the de-duplicated repository over a network. Thus, according to the storage-network de-duplication techniques described herein, the de-duplication server does not use a separate repository for network chunks and a separate file system repository for file blocks. Instead, the de-duplication server uses only a unified de-duplicated repository. Furthermore, the de-duplication server uses logic for chunk-breakdown and for chunk signature computation that is unified for the purposes of both storing chunks in the de-duplicated repository and transferring the chunks from the de-duplicated repository over a network.

Figure 2A:
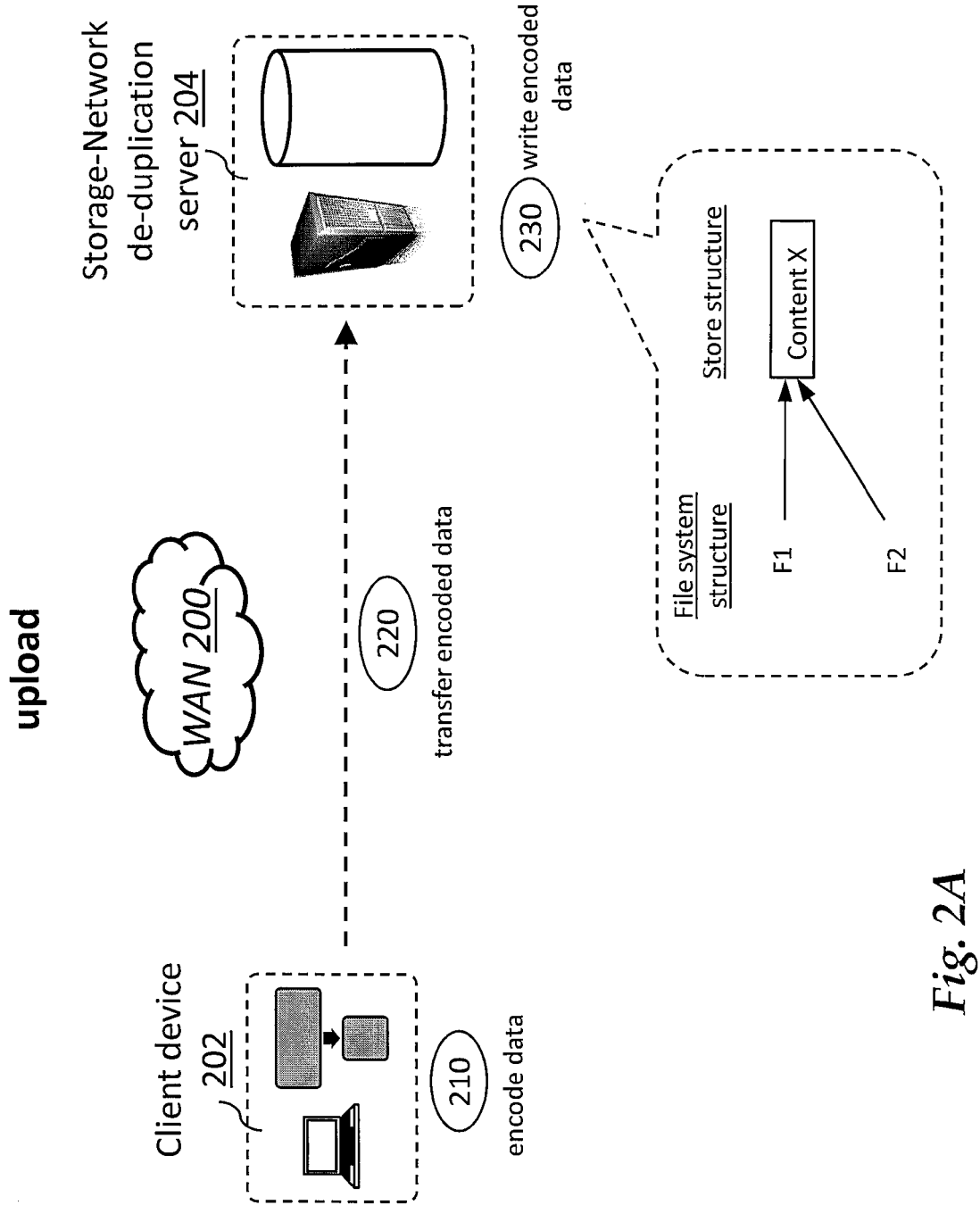
FIG. 2A is a block diagram that illustrates upload of data in an example system that implements data de-duplication according to one embodiment.
Figure 2B:
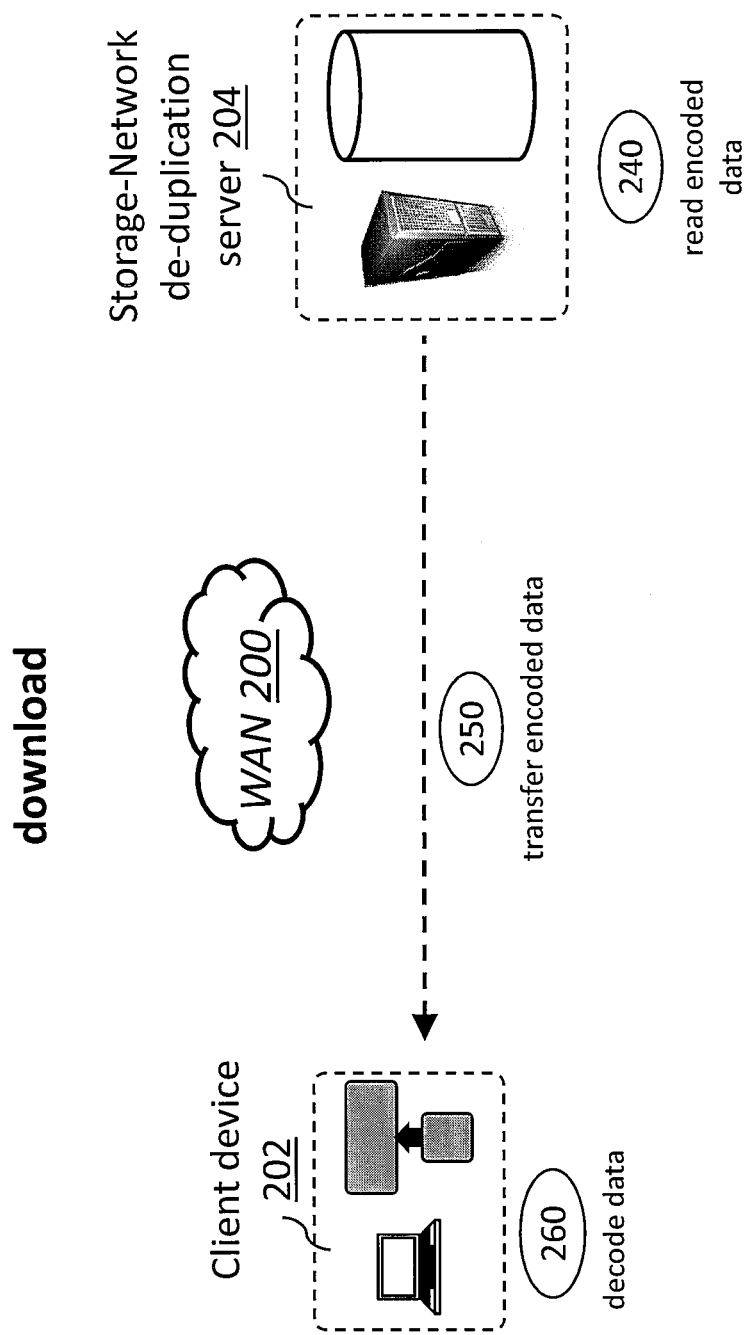
FIG. 2B is a block diagram that illustrates download of data in an example system that implements data de-duplication according to one embodiment.

FIG. 2A is a block diagram that illustrates upload of data in an example system that implements data de-duplication according to the storage-network de-duplication techniques described herein. FIG. 2B is a block diagram that illustrates download of data in an example system that implements data de-duplication according to the storage-network de-duplication techniques described herein. The following terminology is used to explain the example system illustrated in FIGS. 2A and 2B:

Client device—a remote device that holds a file to be synchronized with the de-duplication server.

De-duplication server—The server component that performs storage-network de-duplication in accordance with the techniques described herein.

Referring to FIG. 2A, when client device 202 wants to store (or upload) a file at de-duplication server 204, the following operations take place:
1. Network-Encode (performed by client device 202). A de-duplication logic at client device 202 encodes the file into a list of signatures that identify a sequence of chunks into which the file is broken down, as indicated by step 210. In step 220, client device 202 transfers the list of signatures to de-duplication server 204 over WAN 200.
2. Server-Decode (performed by de-duplication server 204). De-duplication server 204 receives the list of signatures from client device 202 and performs storage-network de-duplication, as indicated by step 230. For example, de-duplication server 204 looks up the list of signatures in its de-duplicated repository. For each signature from the list for which there is no match in the de-duplicated repository, de-duplication server 204 requests the missing chunk corresponding to that signature from client device 202 and stores the missing chunk and its signature into the de-duplicated repository. De-duplication server 204 then increments the reference counts that are associated with the chunks identified in the list of signatures received from client device 202, and stores in the de-duplicated repository a file entry that represents the file and that associates these chunks, along with their signatures, with the file. Thus, a file entry includes a list of <chunk-pointer, chunk-signature> elements.

Compared with the approach of side by side implementation of storage de-duplication and network de-duplication, the storage-network de-duplication techniques described herein attain the following improvements for file uploads:

The File-Encode operation of the side by side approach is completely eliminated. It is noted that the File-Encode operation is an expensive operation because it typically breaks down the file into blocks by using a signature-generation mechanism that is computationally very expensive. Thus, the elimination of the File-Encode operation results in significant savings of processing time and computing resources (e.g., CPU time and memory), and increases the scalability of the de-duplication server (e.g., increases the number of concurrent clients that can be handled by a single server).

The operation of copying the file between the network server and the file server in the side by side approach is completely eliminated, which results in reducing the time it takes to store the file and in eliminating the need for network I/O resources (e.g., bandwidth) that would be otherwise used for copying the file from one server to another.

There is no need to keep two separate sets of copies of the file chunks in two separate repositories, which results in reducing by a factor of 2 the storage needs for implementing the storage-network de-duplication techniques described herein.

Referring to FIG. 2B, when client device 202 wants to download a file from de-duplication server 204, the following operations would take place:

1. Server-Decode (performed by de-duplication server 204). De-duplication server 204 processes the download request for the file in accordance with storage-network de-duplication, as indicated by step 240. For example, de-duplication server 204 uses the file entry representing the file in the de-duplicated repository to fetch the list of signatures that identify the chunks of the file. It is noted that de-duplication server 204 does not need to read the file data and compute the signatures because the file is stored in an encoded format in the de-duplicated repository. In step 250, de-duplication server 204 sends the list of signatures to client device 202 over WAN 200. Thus, the Server-Decode operation does not need to include an additional Network-Encode operation (which can be computationally very expensive) for the purpose of transferring the file over WAN 200.

2. Network-Decode (performed by client device 202). In step 260, a de-duplication client at client device 202 decodes the received list of signatures in accordance with the techniques described herein. For example, the client de-duplication logic looks up the received list of signatures in its client-side repository, and requests from de-duplication server 204 the chunks identified by those signatures for which there is no match in the client-side repository. In response to the request for the missing chunks from client device 202, de-duplication server 204 reads directly from its de-duplicated repository the missing chunks and returns them to client device 202. Client device 202 then assembles the whole file from the chunks indentified in the received list of signatures.

Compared with the approach of side by side implementation of storage de-duplication and network de-duplication, the storage-network de-duplication techniques described herein attain the following improvements for file downloads:

The Network-Encode operation of the side by side approach is completely eliminated because the file chunks are already stored in the de-duplicated repository in a storage encoding that can be used for efficient network transfer and is understood by the client. Thus, the elimination of the Network-Encode operation results in significant savings of processing time and computing resources (e.g., CPU time and memory).

Only one copy of the file chunks needs to be maintained in the de-duplicated repository, and the whole file does not need to be assembled in a regular format. This results in significant gains in processing time and in reduction of the storage used for implementing the storage-network de-duplication techniques described herein.

In this manner, the storage-network de-duplication techniques described herein provide significant savings in performance due to elimination of two processing-intensive encode operations (File-Encode for file uploads, and Network-Encode for file downloads), while at the same time providing bigger storage space savings than the storage savings provided by the side by side approach due to eliminating the storage of extra copies of file chunks for the purpose of network transfers.

3.1 Challenges in Implementing Storage-Network De-duplication 3.1.1 Variable Chunk Sizes and Fixed Disk Block Sizes A significant technological challenge in combining storage de-duplication and network de-duplication exists in determining the unit of "chunking". Typically, regular file systems access a physical disk by using a minimal and fixed-size unit of a disk block. In contrast, network de-duplication mechanisms are not bound to fixed-size chunks. Moreover, some network de-duplication mechanisms use chunking that is content-based, as opposed to location-based. That is, in these network de-duplication mechanisms the chunk boundary is determined based on the content of the data, for example by using a fingerprint function such as the Rabin's fingerprint function. The reason for this is that content-based chunking produces chunks that are much less sensitive to inserts and deletes in files, because a change made in a chunk is confined only to the changed chunk (or to its neighboring chunks in the worst case), but does not affect other chunks in the file. One implication of content-based chunking is that it creates variable-sized chunks. Although a good fingerprint function may generate chunks that are similar in size and averaged around the target chunk size with relatively small variance, the generated chunks do not have the same fixed size since they are not generated strictly based on location (e.g., the generated chunks are not generated from the file by using a fixed location boundary such as, for example, a multiple of 8K bytes). The content-based chunking mechanism, therefore, directly conflicts with the fixed-size property of the disk blocks that are used on a physical disk.

3.1.2 Scattered Disk Blocks

While network de-duplication mechanisms and storage de-duplication mechanisms bear some similarities, they have different and conflicting motivations. Storage de-duplication aims at optimizing storage utilization and trades it off with overhead in performance. In contrast, network de-duplication aims at optimizing network performance and trades it off with overhead in storage. Thus, the objectives and trade-offs of the network de-duplication mechanism and the storage de-duplication mechanism are directly opposite to and conflicting with each other.

The impact of this conflict is that a straight side by side implementation of a storage de-duplication mechanism and a network-duplication mechanism could lead to serious degradation in network performance due to the following reason. Storage de-duplication inherently leads to increased disk seek operations because the notion of physical disk locality is lost as more and more blocks are de-duplicated. That is, in a highly de-duplicated file store, a file's physical blocks are likely to be scattered on the physical disk because the file is pointing to shared blocks that are not likely to be arranged consecutively on the disk. This in turn leads to excessive disk seek operations, which would slow down the retrieval of a file, and therefore affect the overall performance of file read and file write operations over a network, as observed by a network client.

Figure 1C:
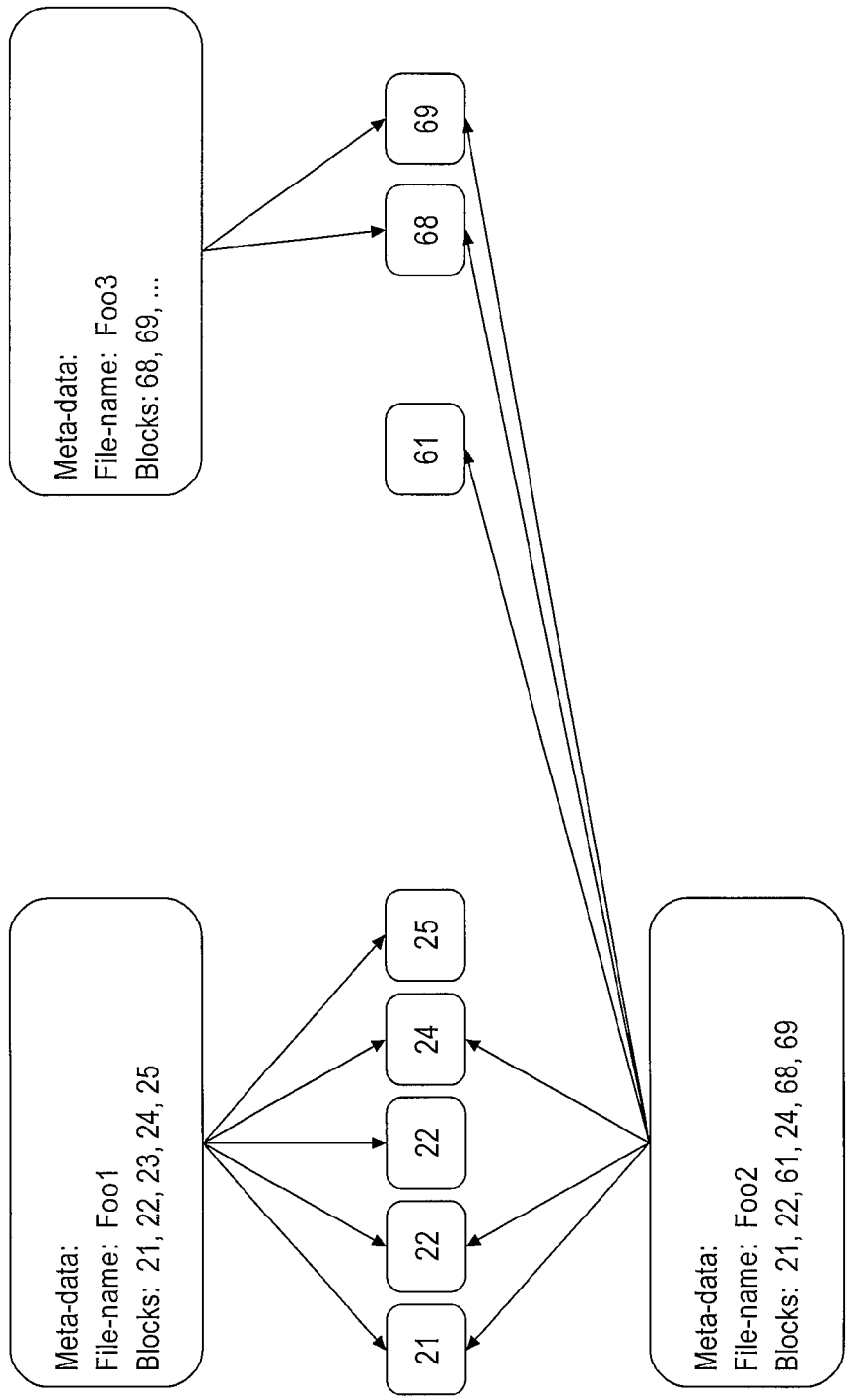
FIG. 1C is a block diagram that illustrates how file data blocks may be scattered in a highly de-duplicated file store.

FIG. 1C is a block diagram that illustrates how file data blocks may be scattered in a highly de-duplicated file store. FIG. 1C illustrates two files, Foo1 and Foo2. Foo1 was allocated first, and all 5 of its data blocks were allocated in consecutive disk blocks on the physical disk to maximize access performance. Foo2 is a revision of Foo1 and has redundant data blocks that appear in Foo1: data blocks 21, 22, and 24 are shared and therefore de-duplicated, whereas data blocks 61, 68, and 69 are not shared with Foo1 (although data blocks 68 and 69 are shared with another file, Foo3). While a reading of Foo1 would be fast and involve minimal disk seek operations, the sequential reading of Foo2 would involve multiple disk seek operations. If the overhead of disk seek operations is estimated in terms of distance traveled between data blocks, then the reading of Foo1 would take 4 units (data block 21 to data block 22, data block 22 to data block 23, data block 23 to data block 24, and data block 24 to data block 25), while the reading Foo2 would use 122 units.

3.1.3 Chunk Size Considerations

As discussed above, the considerations about the size of physical disk blocks are very different from the considerations about the size of chunks used in network de-duplication mechanisms. In particular, network de-duplication mechanisms may benefit from very large chunks (assuming large redundant datasets), or very small datasets (e.g., chunks of 100 bytes that can be eliminated by embedding in objects that are not identical across files). Thus, a straight side by side implementation of a storage de-duplication mechanism and a network-duplication mechanism faces a challenge in finding a proper chunking mechanism that reconciles the considerations about the size of physical disk blocks with the considerations about network optimization as affected by the size of chunks used in network de-duplication.

3.2 Solutions to the Challenges in Implementing Storage-Network De-duplication

3.2.1 Reconciling Disk Block Sizes and Network Chunk Sizes

The storage-network de-duplication techniques described herein use a fingerprinting logic that is configured to generate chunks that are up to, but no more than, a certain size. The certain size may be directly related to the size of the physical disk blocks that are used in a particular implementation. For example, in one embodiment the certain size enforced by the fingerprinting logic may be the same as the size of the physical disk blocks in which the chunks generated by the fingerprinting logic are to be stored. In another embodiment, the certain size enforced by the fingerprinting logic may be smaller than the size of the underlying physical disk blocks by a fixed amount that accounts for a fixed overhead that is used in each physical disk block.

Figure 3A:
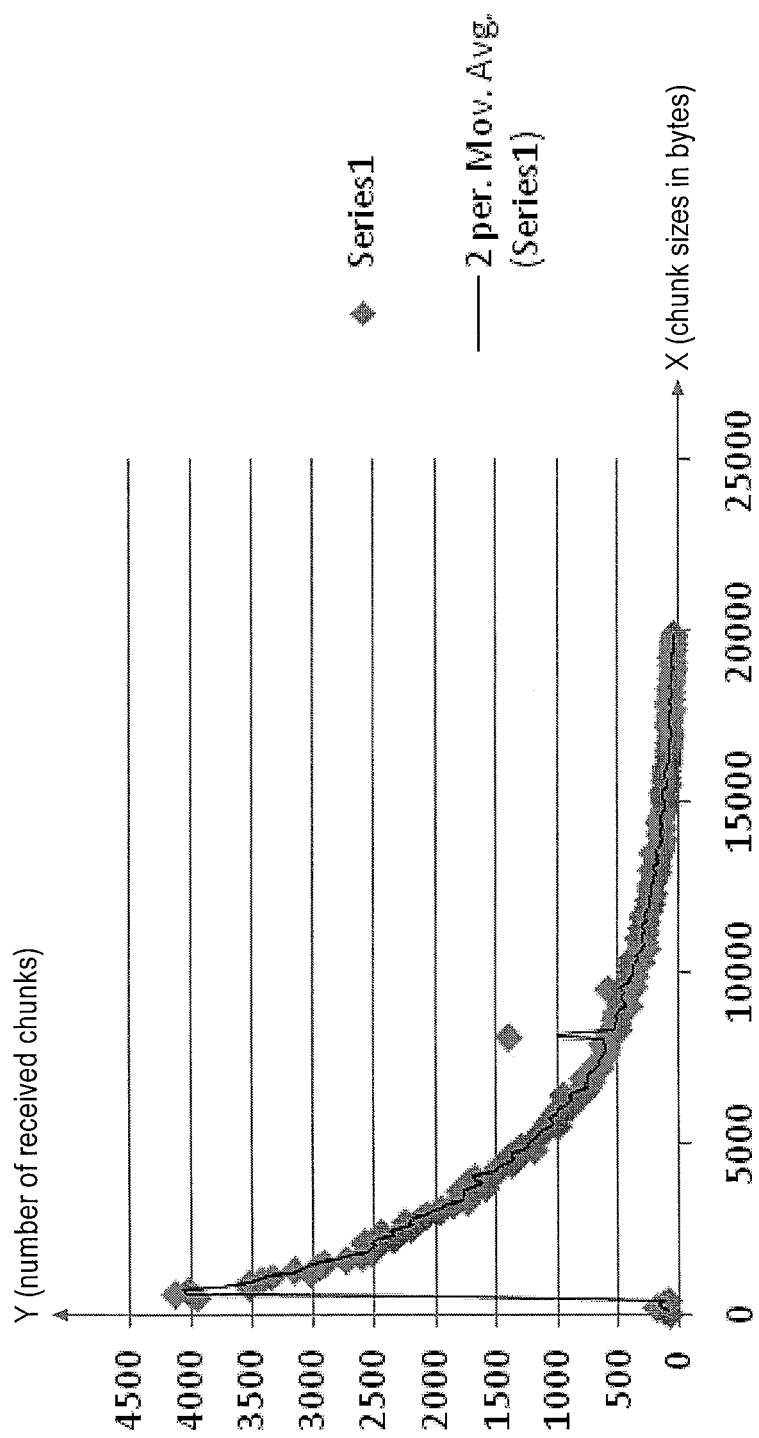
FIG. 3A is a block diagram that illustrates a graph of average and standard deviation for chunk size distribution that can be used to determine parameter configurations for a fingerprinting logic according to one embodiment.
Figure 3B:
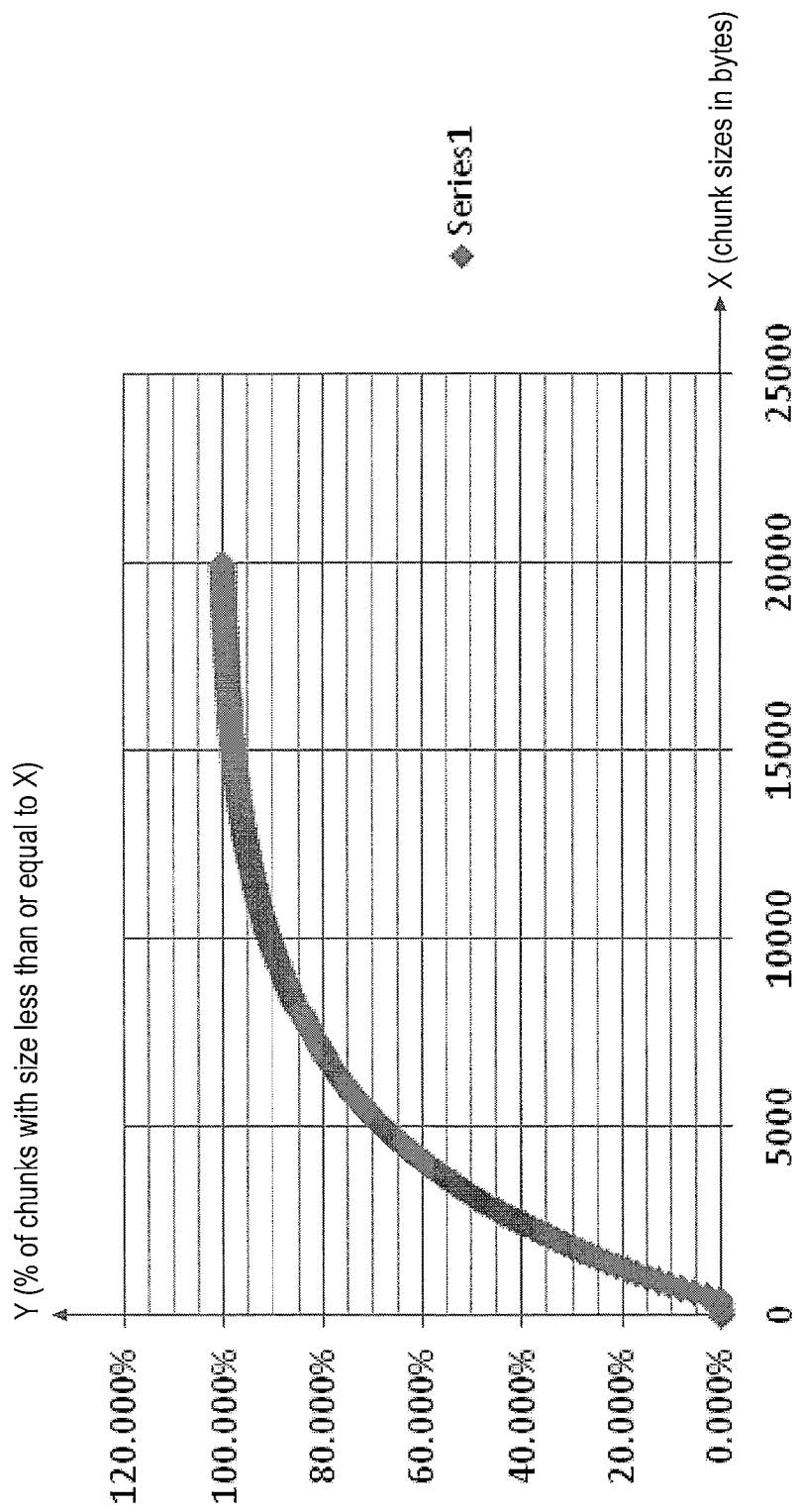
FIG. 3B is a block diagram that illustrates a graph of a cumulative form for the average and standard deviation for the chunk size distribution illustrated in FIG. 3A.

According to the techniques described herein, the fingerprinting logic runs on arbitrary data input and produces chunks of variable sizes with average (AVG) near $2^N$ bytes and standard deviation (STD) near $2^N$ bytes, where N is the number of bits in the fingerprint anchor point (i.e., the number of bits on which the fingerprinting logic is applied in order to determine whether a chunk boundary has been reached). For example, the distribution of chunk sizes for AVG of 4096 bytes (with N=12) is illustrated in the graph depicted in FIG. 3A. The graph in FIG. 3A depicts the result of running the fingerprinting chunking logic on a typical data set. The X axis represents chunk sizes in bytes. The Y axis represents the number of chunks that were received. The graph depicted in FIG. 3A can be used to determine parameter configurations for a fingerprinting logic according to one embodiment, where the parameter configurations cause the fingerprinting logic to produce chunks that can have variables sizes of up to, but no more than, a certain size. FIG. 3B shows another view on the result of running the fingerprinting chunking logic on a typical data set. The X axis represents the received chunk sizes in bytes, and the Y axis represents in cumulative form the percentage of chunks whose size was less or equal than the given size X.

The graphs in FIGS. 3A and 3B show how to determine, from probability perspective, the optimal chunk size (that produces minimal storage waste by causing chunk boundaries to be around that chunk size most of the time) that can be used with physical disk blocks of a particular fixed size. If the fingerprinting logic distributes chunk sizes with close to normal distribution, then according to the properties of normal distribution, AVG(N)+2*STD(N) will cover more than 84% of the cases for a chunk size of 8K bytes (since AVG(N)=4K and STD(N)=4K). If a storage system uses a physical block size of AVG(N)+2*STD(N) (i.e., 12K), then over 97% of the generated chunks will have sizes that are smaller than the block size. However, internal fragmentation may be higher. Thus, under the normal distribution assumption, the formula for determining N given block size B is $N=\log_2 B-1$. However, other chunking algorithms may have a different distribution and a different standard deviation, so in general, for a disk block of size B, a de-duplication system should use N such that $2^N+STD(N)=B$, where N is the number of bits in the fingerprints computed by the employed fingerprinting logic.

Thus, in order to address the technological challenge caused by the fix-sized physical disk blocks and the need for chunks of variable, content-based sizes, in one embodiment the storage-network de-duplication techniques described may employ the following solution.

The fingerprinting logic is configured to generate chunks of variable sizes $N_1, N_2, \ldots N_K$ that are close but not necessarily equal to a certain size N, such that the sum of $AVG(N_1, N_2, \ldots N_K)$ and $STD(N_1, N_2, \ldots N_K)$ is equal to the size of a physical disk block (e.g., 8 KB). However, when computing chunks, the fingerprinting logic allows chunks to be up to, but not more than, the size of a physical disk block.

For example, if the fingerprinting logic determines chunk boundaries that delimit a chunk which is smaller than or equal to the size of a physical disk block, then the rest of the physical disk block (if any) is not used. While this might lead to some internal fragmentation that does not exist in a regular file storage system, such internal fragmentation is still negligible compared to the savings that accrue due to the ability to de-duplicate a significantly larger number of the chunks of a file—e.g., a search for the chunks of the file in the de-duplicated repository would find that more of the file chunks are already stored therein than would be otherwise found if location-based, disk-block-size chunking is used.

If, however, the fingerprinting logic determines chunk boundaries that delimit a chunk that is bigger than the size of a physical disk block, the fingerprinting logic arbitrarily forces the chunk to be of the maximum possible size after accounting for disk block overhead (if any). That is, a chunk cannot exceed the size of a physical disk block. If data is inserted in a file that contains such maximum-size chunk after the chunk is stored, then the fingerprinting logic is applied to the file to determine a new chunk boundary for the new chunk. While this implies that the chance of re-chunking (and hence a somewhat reduced de-duplication) due to data insertion in a file may be somewhat larger when compared to a regular network de-duplication system, such data insertion would still be limited to the first chunk, in the sequence of chunks that form the file, that has sufficient extra size to accommodate the additional data without exceeding the size of the physical disk block.

It is noted that, in accordance with the techniques described herein, choosing the chunk size in this way (e.g., that the sum of AVG(N)+STD(N) would be the size of a physical disk block) will avoid the above arbitrary forced chunking in the vast majority of the cases, and thus will result in small deviations and hence will have little impact on de-duplication. Further, and more importantly, it is noted that the benefits of the storage-network de-duplication techniques described herein on both network performance and storage utilization still outweigh by far the marginal degradation that may be caused in some cases by forced chunking.

3.2.2 Addressing the Challenge of Scattered Disk Blocks

In order to address the technological challenge caused by the scattering of a file's physical disk blocks, in one embodiment the storage-network de-duplication techniques described herein employ the following solution for a file download (e.g., a request by a client device to download or read a file from a de-duplication server):

1. Server-Decode (performed by the de-duplication server). The de-duplication server locates the signatures that identify the chunks of the file in the de-duplicated repository and sends a list with the signatures to the client device. There is no need to perform a Network-Encode operation because the de-duplication server reads the signatures directly from the de-duplicated repository.
2. Network-Decode (performed at the client device). A de-duplication client at the client device checks the received list of signatures against its chunk repository to determine which chunks, identified by the list of signatures, are already stored in the repository. The de-duplication client then requests the missing chunks by sending to the de-duplication server a list of signatures that identify the missing chunks.
3. Upon receiving the list of signatures for the missing chunks, the de-duplication server determines the physical disk block IDs that correspond to the received list of signatures. The de-duplication server then sorts the received list by physical disk block ID (as opposed to by logical location of the chunks in the file) and performs the necessary disk accesses according to the physical order of the disk blocks as indicated by the sorted list. For example, with respect to the physical order of disk blocks as shown in FIG. 1C, assuming that all blocks of file Foo2 were missing on the client side (e.g., it was a first time read of the file by the client device), the de-duplication server would read the disk blocks in sorted physical order (i.e., 21, 22, 24, 61, 68, 69), which results in an optimal shortest distance of 48 units. After accessing the physical disk blocks and retrieving the missing chunks, the de-duplication server can send these missing chunks to the client device in either the physical order or in the logical order indicated by the logical location of the chunks in the file.

The above solution to the scattered disk block challenge works well in operational contexts in which a client device needs to read whole files from a de-duplication server and needs to write whole files to the de-duplication server. For example, when a user application wants to read a file, a de-duplication client on the client device requests the whole file and indexes it in its client-side chunk repository. It is noted that this does not imply that the de-duplication client necessarily needs to wait for the whole file to be downloaded before serving file data to the user application. Rather, the de-duplication client can stream file data to the user application while the rest of the file data is being fetched from the de-duplication server.

In such operational contexts, in many cases redundancy across files occurs due to copying a file, modifying it, and saving it as a new file. From the perspective of de-duplication, these user-level operations result in sequences of consecutive disk block IDs with occasional changed blocks because, for example, the de-duplication client may use a content-based chunking mechanism, which ensures that the locality of changes is confined to relatively few chunks. In many other cases, redundancy across files occurs due to sharing of common objects such as, for example, libraries, attachments, etc. Thus, the above solution to the scattered disk block challenge works well in these operational contexts even if the de-duplication server eliminates the storage of a lot of redundant file chunks, and the de-duplicated repository operated by the de-duplication server ends up storing files in a highly de-duplicated state (e.g., files that have file chunks stored in many non-consecutive physical disk blocks).

3.2.3 Addressing the Chunk Size Considerations

In order to address the technological challenge caused by the different considerations about disk block sizes and chunk sizes, the techniques for storage-network de-duplication described herein may implement several mechanisms for aggregating chunks. For example, in some operational contexts it is often useful to consider aggregation of chunks so that instead of sending a signature for small chunk, in case multiple consecutive chunks can be eliminated as one big chunk, a signature can be computed for the aggregation and sent out to eliminate a larger amount of data with a single signature, which results in improved storage de-duplication as well as improved network performance. Thus, aggregation of chunks may be used by some embodiments of the techniques described herein to attain more improvements of storage utilization and network performance than would be attained by a straight side by side implementation of storage de-duplication and network de-duplication.

File-Level Aggregation

In many operational contexts, duplicated files with identical contents are transferred over a network and are stored multiple times. For example, when a revised operating system image needs to be transferred from a data center to a client device, in most cases the vast majority of the operating system files has not changed. Also, in many cases the same file is stored multiple times, e.g., when performing a file copy operation. This implies that a very useful scale for aggregating chunks is the file. (It is noted that systems employing only network de-duplication do not have a notion of files, and therefore cannot employ the file-level chunk aggregation scheme described herein.)

In order to support file-level chunk aggregation, in one embodiment the techniques described herein provide the following mechanism. A de-duplication server computes a file-level signature for each file from the entire content of this file. Then, the de-duplication server stores the file-level signature in the file entry for this file that is stored in the de-duplicated repository. Then, in response to a request to read the file, the de-duplication server sends the file-level signature along with the list of signatures that identify the chunks of the file. On the client device side, the de-duplication client first checks the file-level signature against its client-side repository. If the de-duplication client finds the file-level signature in its repository, it means that the chunks of the file are already stored in the client-side repository and thus the de-duplication client does not need to check the list of chunk signatures for any missing chunks.

Conversely, when a client device wants to upload a file to the de-duplication server, in addition to calculating chunk boundaries and signatures, the de-duplication client at the client device also computes the file-level signature of the file. (It is noted that there is no need for the de-duplication client to re-read the file since the file-level signature is computed in the same pass that the chunk-level signatures are being computed). The client device then first sends the file-level signature to the de-duplication server. If the de-duplication server finds a match, then there is no need for the de-duplication server to request the chunk signatures of the file chunks, and the file is de-duplicated based on the file-level signature. The de-duplication server then generates a new file entry for the file and adds a reference counter to the file entry. Otherwise, if the de-duplication server does not find a matching file-level signature, the de-duplication server requests and the client device sends the chunk signatures of the file chunks as described above. When the file transfer ends, the de-duplication server generates a file-level signature and adds it to the metadata information of the file that is stored in the de-duplicated repository. The file-level signature can be generated locally by the de-duplication server during the same pass in which the chunks and the chunk-level signatures are processed. This can be done by reading the content of de-duplicated chunks from the local de-duplication repository, and combining them with the non de-duplicated chunks that are received from the client device, to form a sequential whole file view, from which a file-level signature is generated. Alternatively, the client device can send the file-level signature to the de-duplication server during or at the end of the file transfer procedure.

Another advantage of this file-level aggregation mechanism is that, at the de-duplication server side, a de-duplicated repository may be implemented on top of a standard file system—e.g., without the need to implement a proprietary file system to support the storage structure of the de-duplicated repository.

Chunk/Block Aggregation

In some cases, there may be two or more files with large amounts of common data, where the size of the common data is much larger than the chunk size but smaller than the file size. For such cases, in one embodiment the techniques described herein provide the following chunk-level aggregation mechanism. Two chunks {A} and {B} can be aggregated if and only if these two chunks are found in N (N>=2) files, consecutively. The de-duplication server keeps a table or an index with metadata information that indicates such consecutive chunks, where the table or index would store the following entry for chunks {A} and {B}:

signature {A}, signature {B} => signature {AB} where the signature{AB} is used whenever chunk {A} is found.

The chunks {A} and {B} may be stored on the physical disk according to one of the following three storage representations:
 (1) store chunks {A} and {B} in separate physical disk blocks and only add an index entry for the signature{AB} => A+B in an index of chunks signatures;
 (2) store chunks {A} and {B} in separate physical disk blocks, and also store the chunk {AB} in consecutive physical disk blocks with a corresponding index entry in the index of chunks signatures;
 (3) do not store chunks {A} and {B} (or remove them if previously stored), but only store the chunk {AB} in consecutive physical disk blocks with a corresponding index entry in the index of chunks signatures.

Storage representation (1) is preferred in operational contexts in which the network (e.g., a WAN) is the real bottleneck in the system. Storage representation (2) is preferred in operational contexts in which the occurrence of the large chunk {AB} is frequent and is repeated in many files (e.g., in more than 5 files). Storage representation (3) is good when the reference counts for chunks {A}, {B}, and {AB} are equal, i.e., when reference count (A)=reference count (B)=reference count (AB).

4.0 Example Embodiments and Features of Storage-Network De-Duplication Systems

Figure 4A:
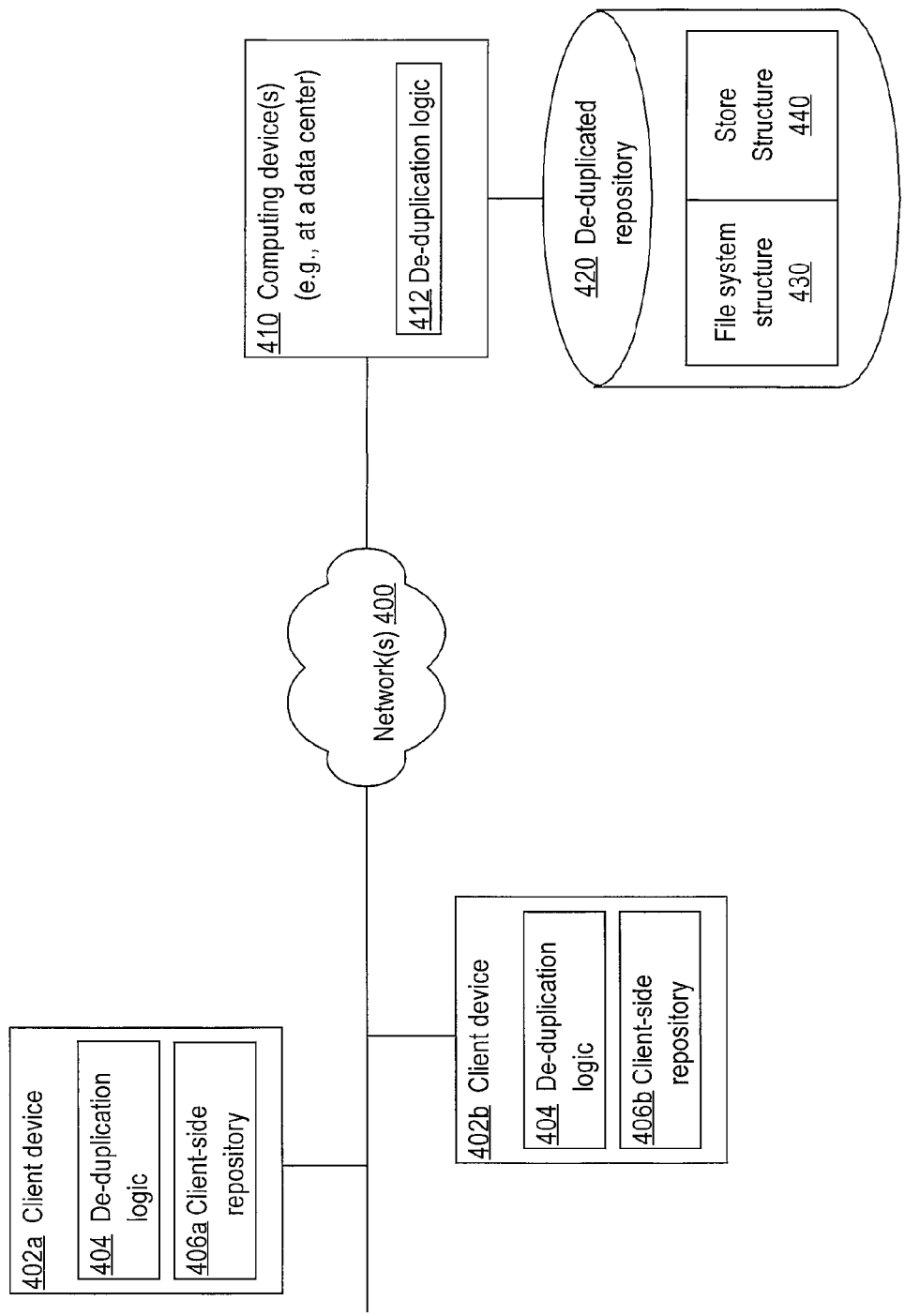
FIG. 4A is a block diagram that illustrates an example system according to one embodiment.

FIG. 4A is a block diagram that illustrates an example system according to one embodiment of the storage-network de-duplication techniques described herein. The example system comprises one or more computing devices 410 (e.g., computing devices configured to operate one or more servers in a data center) and a (possibly quite large) number of computing devices such client devices 402a and 402b. Client devices 402a and 402b may connect to computing device(s) 410 over one or more networks 400, which may include one or more LANs and/or WANs.

Computing device(s) 410 comprise de-duplication logic 412 that is operable to store and manage data in de-duplicated repository 420 in accordance with the storage-network de-duplication techniques described herein. In some embodiments, de-duplication logic 412 may be implemented in a de-duplication server that executes on computing device(s) 410.

As used herein, "logic" refers to a set of instructions which, when executed by one or more processors, are operable to perform one or more functionalities. In various embodiments and implementations, any such logic may be implemented as one or more software components that are executable by one or more processors or as any combination of one or more software and hardware components such as Application-Specific Integrated Circuits (ASICs). For example, any particular logic may be implemented, without limitation, as a server, as a client, as one or more software modules, as one or more libraries of functions, as one or more dynamically linked libraries, and as a standalone or a client-server software application. As used herein, "server" refers to a combination of integrated software components and an allocation of computational resources, such as memory, CPU time, and/or disk storage space, where the integrated software components are operable to perform one or more functionalities. "Client" refers to a combination of integrated software components and an allocation of computational resources, where the components are operable to perform some functionalities themselves and also to request the performance of some functionalities (e.g., services) from a server.

In some embodiments, computing device(s) 410 may also comprise fingerprinting logic (not shown in FIG. 4A) that may be separate from, or may be included in, de-duplication logic 412. In accordance with the techniques described herein, when executed by computing device(s) 410, the fingerprinting logic is operable to compute a fingerprint function over the contents of a file in order to determine chunk boundaries that delimit one or more variable-size chunks in the file. For example, in an operational context in which computing device(s) 410 operate in a data center, computing device(s) 410 may execute the fingerprinting logic on new files that are stored in the data center directly without first being received from a remote client device. Examples of such new files include, without limitation, new files that are stored in device images at the data center as part of system-wide updates (e.g., OS updates), and new files that are generated at the data center by some data maintenance operation (e.g., such anti-virus or other management operation.)

In some embodiments, computing device(s) 410 may also comprise signature-generating logic (not shown in FIG. 4A) that may be separate from, or may be included in, de-duplication logic 412. In accordance with the techniques described herein, when executed by computing device(s) 410, the signature-generating logic is operable to compute a collision-resistant signature for a set of data such as a chunk of a file or an entire file. As used herein, "signature" (or "digest") of a set of data refers to a value that is computed from the content of the set of data and that can be used to identify the set of data with a high degree of accuracy. For example, once a chunk is delimited in a file, the signature-generating logic may compute a collision-resistant cryptographic hash function from the bits in the chunk in order to compute a signature for that chunk. Examples of functions that can be used to compute a signature include, but are not limited to, Message Digest 5 (MD5), Secure Hash Algorithm-1 (SHA-1), Hash127, Panama Hash, and any other functions that may be now known or later developed. In general any function, which produces a sufficiently large signature to satisfy the collision-resistance goals of a particular embodiment, may be used in conjunction with the techniques described herein.

Computing device(s) 410 are operable to store and manage data in de-duplicated repository 420 by using a unified, single storage encoding in accordance with the storage-network de-duplication techniques described herein. In various embodiments, de-duplicated repository 420 may be implemented on persistent storage media (e.g., such non-volatile media like optical or electromagnetic disks), on volatile or portable storage media (e.g., such as random access memory (RAM) or thumb drives), and in any combination of persistent and volatile storage media. According to the techniques described herein, de-duplicated repository 420 comprises file system structure 430 and store structure 440. Store structure 440 is a physical or logical data structure that is configured to store a single copy for each unique chunk among a set of chunks that comprise the files and other file system objects stored in de-duplicated repository 420. File system structure 430 is a physical or logical data structure that is configured to provide a view of the de-duplicated repository 420 as a regular file system to external entities, while internally storing data in de-duplicated form by maintaining references to a single copy of a unique chunk from those file system objects that contain that chunk. File system structure 430 and store structure 440 are also configured to store some additional metadata information for each file system object stored in de-duplicated repository 420 (e.g., permissions, Access Control List (ACL), etc.) and for each unique chunk (e.g., a signature and a reference count).

In some embodiments, the techniques described herein provide an application programming interface (API) that is operable to look up signatures directly in store structure 440 in order to find corresponding chunks or to determine that corresponding chunks are not stored therein. For example, such API may be provided as part of de-duplication logic 412 or may be provided as a separate module or library of functions to operate on de-duplicated repository 420. It is noted that current implementations of pure storage de-duplication mechanisms do not provide an external interface for searching by signature because these mechanisms operate on whole files and thus have no use for a functionality that accesses individual file chunks. In contrast, the storage-network de-duplication techniques described herein may provide in some embodiments an API for looking up signatures directly into store structure 440 because there are novel uses of the individual chunks that are stored therein—namely, for finding individual chunks in the store structure and for transmitting individual chunks from the store structure across a network when requested by a client device without the need for additional transformation or encoding of the chunks.

Computing device(s) 410 are operable to connect over network(s) 400 to one or more client devices such client devices 402a and 402b. As used herein, "client device" refers to a computing device that is operable to execute an OS and software applications for a user, to store user data. Examples of client devices include, but are not limited to, desktop computers, laptop computers, and wireless mobile devices such as personal digital assistants (PDAs) and smart phones like iPhone, BlackBerry, and Treo. It is noted that the techniques for storage-network de-duplication described herein are not limited to being implemented for any particular type of client device; rather the techniques described herein may be implemented on any type of now known or later developed client device that is operable to execute software applications and to store data for a user. For this reason, the examples of computing devices provided herein are to be regarded in an illustrative rather than a restrictive sense.

According to the techniques described herein, a client device comprises de-duplication logic and client-side repository. For example, client device 402a comprises de-duplication logic 404 and client-side repository 406a; similarly, client device 402b comprises de-duplication logic 404 and client-side repository 406b. A client-side repository is a set of one or more storage structures, implemented on persistent and/or volatile storage media, that are configured to store de-duplicated data. In various embodiments, de-duplication logic 404 may be implemented, without limitation, as a de-duplication client executing on a client device, as a standalone application, and as a network and/or file system driver. When executed by a client device, de-duplication logic 404 is operable to de-duplicate data and to store the de-duplicated data in the client-side repository.

For example, in some embodiments the client-side repository may be a cache repository that is operable to store file chunks. In these embodiments, de-duplication logic 404 may be operable to perform network de-duplication for files based on chunks and signatures thereof that are received from computing device(s) 410. For example, de-duplication logic 404 may be operable to download, receive, or read files over a network by: receiving file chunks and de-duplicating the file chunks in the cache repository, assembling the file chunks into files, and storing the assembled files into a file system at the client device or passing the file chunks and/or the assembled files to applications executing at the client device. De-duplication logic 404 may be operable to upload, send, or write files over the network by: receiving requests from applications to upload/send/write files, breaking down the files into file chunks and generating the signatures thereof, storing the file chunks and the signatures thereof in the cache repository, and sending the file chunks and/or the signatures thereof from the cache repository to destinations across the network.

In another example, in some embodiments de-duplication logic 404 may be operable to perform storage-network de-duplication as described herein. In these embodiments the client-side repository, in which the de-duplicated data is stored, is a de-duplicated repository operable to store files using the unified, single storage encoding in accordance with the storage-network de-duplication techniques described herein.

In one operational example according to one embodiment, suppose that an application executing on client device 402a wants to upload or store a file in de-duplicated repository 420. The application invokes or causes de-duplication logic 404 to be invoked. De-duplication logic 404 breaks down the file into chunks, for example, by invoking a fingerprinting logic in accordance with the storage-network de-duplication techniques described herein. The fingerprinting logic applies a fingerprint function to the content of the file in order to determine the chunk boundaries and generates the chunks of the file. Concurrently with generating the chunks of the file or thereafter, de-duplication logic 404 invokes or causes to be invoked a signature-generating logic that generates a signature for each chunk in accordance with the techniques described herein. After generating the signatures, de-duplication logic 404 looks up the signatures in client-side repository 406a to determine whether there are any file chunks that are not stored therein. If there are some chunks of the file that are not stored in client-side repository 406a, de-duplication logic 404 stores these file chunks and the signatures thereof in the client-side repository. (It is noted that in some cache-based implementations, storing chunks and signatures thereof may involve evicting some older chunks from the client-side repository). De-duplication logic 404 then generates a list of signatures that respectively identify the list of chunks that comprise the file. Thereafter, de-duplication logic 404 sends to computing device(s) 410 a request to store the file in de-duplicated repository 420, where the request includes a file ID (e.g., a filename or some other unique file identifier) and the list of signatures but does not include the actual chunks of the file.

In response to receiving the request with the list of signatures from client device 402a, computing device(s) 410 store the file in de-duplicated repository 420 by using a single storage encoding in accordance with the storage-network de-duplication techniques described herein. For example, de-duplication logic 412 is invoked to look up the list of signatures in store structure 440 in order to determine whether any chunks identified by the signatures in the list are not stored in de-duplicated repository 420. For chunks that are already stored in de-duplicated repository 420, de-duplication logic 412 increments the reference counts associated with these chunks. De-duplication logic 412 then requests, from client device 402a, those chunks that are identified in the list and that are missing from de-duplicated repository 420. Upon receiving the missing chunks from client device 402a, de-duplication logic 412 stores each missing chunk and the signature thereof in store structure 440 and increments the reference count associated with that chunk. De-duplication logic 412 also stores in file system structure 440 a file entry that represents the file, where the file entry stores the file ID and the list of signatures received in the request thereby associating the file ID with the list of signatures that identify the chunks of the file. This completes the operation of uploading the file from client device 402a to de-duplicated repository 420.

In another operational example according to one embodiment, suppose that an application executing on client device 402a wants to download or read a file from de-duplicated repository 420. The application requests the file by invoking or causing de-duplication logic 404 to be invoked. When invoked, de-duplication logic 404 sends a request for the file to computing device(s) 410, where the request includes a file ID of the file.

Upon receiving the request to download the file, de-duplication logic 412 is invoked to look up the file ID in file system structure 430. Based on the file ID, de-duplication logic 412 determines the file entry that represents the requested file and retrieves from the file entry the list of signatures that identify the chunks of the file. De-duplication logic 412 then sends a response to client device 402a, where the response includes the list of signatures but does not include the corresponding file chunks.

At client device 402a, de-duplication logic 404 receives the list of signatures and looks up the signatures in client-side repository 406a to determine whether all chunks identified by the signatures in the list are stored in the client-side repository. If all identified chunks are already stored in client-side repository 406a, de-duplication logic 404 retrieves the chunks, assembles the file from the chunks (if necessary or if requested by the application), and passes the chunks or the assembled file (e.g., a file handle) to the application that requested the file. If there are file chunks that are missing from client-side repository 406a (e.g., because of cache maintenance operations), de-duplication logic 404 generates a list of signatures identifying the missing chunks and sends the list in a request to computing device(s) 410. Computing device(s) 410 (or a component thereof such as de-duplication logic 412) receive the request with the list of signatures of the missing chunks, uses the signatures to retrieve the missing chunks directly from store structure 440, and sends the missing chunks to client device 402a. At client device 402a, de-duplication logic 404 receives and stores the missing chunks in client-side repository 406a. De-duplication logic 404 then assembles the file from the chunks (if necessary or if requested by the application), and passes the chunks or the assembled file (e.g., a file handle) to the application that requested the file. This completes the operation of downloading the file from de-duplicated repository 420 to client device 402a.

4.1 De-duplicated Repository

According to the techniques for storage-network de-duplication described herein, a de-duplicated repository uses a unified, single storage encoding to de-duplicate files. The de-duplicated repository keeps a single copy of each unique chunk of the objects in a file system, and maintains multiple references to this copy from all file system objects that contain this copy.

Figure 4B:
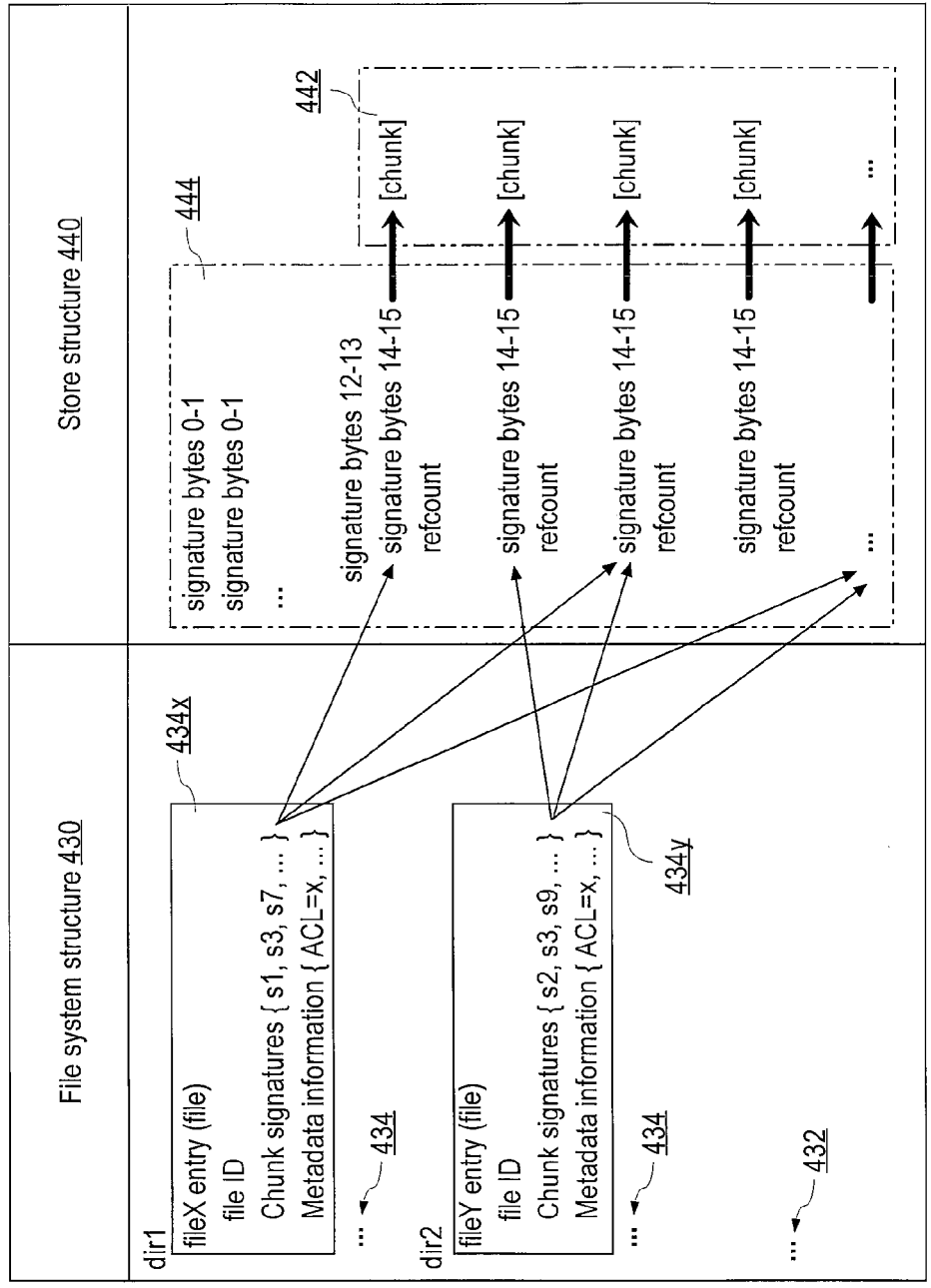
FIG. 4B is a block diagram that illustrates a de-duplicated repository according to one embodiment.

FIG. 4B is a block diagram that illustrates a de-duplicated repository according to one embodiment of the techniques described herein. De-duplicated repository 420 comprises file system structure 430 and store structure 440.

File system structure 430 is a data structure that provides a view as de-duplicated repository 420 looks from external entities such as file clients and various APIs. For example, file system structure 430 makes de-duplicated repository 420 look like a regular file system to external entities, while internally the files are encoded according to the unified, single storage encoding described herein.

File system structure 430 comprises one or more directory structures (as indicated by ellipsis 432) and one or more file entries within the one or more directory structures (as indicated by ellipsis 434). A directory structure includes metadata information that identifies a directory (e.g., a directory name, a directory ID, etc.) and one or more file entries that represent one or more files that are stored in de-duplicated repository 420. For example, FIG. 4B illustrates directory "dir1" that stores file entry 434x that represents "fileX" and directory "dir2" that stores file entry 434y that represents "fileY".

A file entry (also referred to herein as "file container") stored in file system structure 430 is a structured data record that stores information associated with the file represented by that file entry. The file entry may be structured to look like a file entry in a regular file system, and can be manipulated (e.g., accessed, read, and written to) by using a file system API that is configured to access files in de-duplicated repository 420. For example, a file entry that represents a given file stores one or more file IDs for that file (e.g., a filename and/or some other unique file identifier) and other metadata information for the file including, but not limited to, ACLs, permissions, user ID of the file owner, creation date, last-access date, last-modified date, the file type, and various attributes of the file (e.g., read-only, archived, etc.). In accordance with the techniques described herein, the file entry does not store the actual file data; rather, the file entry stores the list of signatures that identify the chunks that comprise the file represented by that file entry. In some embodiments, such as the embodiment illustrated in FIG. 4B, the chunk signatures stored in a file entry may be used as references or pointers to the actual storage locations in store structure 440 where the corresponding chunks are stored. In other embodiments, in addition to the list of chunk signatures, a file entry may store references or pointers to the actual physical disk blocks that store the file chunks identified by the signatures.

For example, as illustrated in FIG. 4B, file entry 434*x* represents file "fileX" and stores the file ID for that file as well as metadata information that includes the ACL for that file. File entry 434*x* also stores the list of chunk signatures "{s1, s3, s7, . . . }" that identify the chunks into which file "fileX" has been broken down into, where the signatures are used to identify the locations into store structure 440 where their corresponding chunks are stored. (It is noted that for illustrative purposes only, the signatures are represented by using the symbols such as "s1"; in practice, a signature is stored in a file entry as a binary value.) Similarly, file entry 434*y* represents file "fileY" and stores the file ID for that file as well as metadata information that includes the ACL for that file. File entry 434*y* also stores the list of chunk signatures "{s2, s3, s9, . . . }" that identify the chunks into which file "fileY" has been broken down into, where the signatures are used to identify the locations into store structure 440 where their corresponding chunks are stored.

Store structure 440 (also referred to herein as "single instance store") stores the unique chunks to which the file entries in file system structure 430 point. Thus, the file entries in file system structure 430 have references (e.g., chunk signatures and/or location-based pointers) into store structure 440, while store structure 440 stores the actual data and provides the ability for fast search and retrieval of that data.

Store structure 440 is a data structure that stores chunks 442 and the signatures 444 of the stored chunks. In the embodiment illustrated in FIG. 4B, store structure 440 is indexed based on the values of the chunk signatures. In order to facilitate faster search and retrieval, store structure 440 is organized in multiple hierarchical levels, where a different subset of the bits in a signature is used as a key for each different level. For example, as illustrated in FIG. 4B, the first 16 bits (e.g., bytes 0-1) of the signature of a chunk are used as key into the first level, the next 16 bits (e.g., bytes 2-3) of the signature are used as a key into the next level, and so on; the last 16 bits (e.g., bytes 14-15) of the signature are used as key into the last level and point to the actual data of the chunk that is identified by the signature.

In some embodiments, store structure 440 may be implemented as a physical structure that includes a plurality of physical disk blocks, where each physical disk block would store a unique chunk, the signature of this chunk, and possibly some metadata information about this chunk such as a reference count. In other embodiments, store structure 440 may be implemented as a logical structure that is stored within one or more files that are physically stored in a regular file system. In these embodiments, store structure 440 may store the different chunks and the signatures thereof at different offsets within the one or more file in such manner as to facilitate for fast search and retrieval of the chunks from the one or more files.

In some embodiments, the techniques described herein may be used to provide de-duplication at a file level instead of at a chunk level—in other words, these embodiments would de-duplicate entire files. In these embodiments, a de-duplicated repository stores a single copy of each unique file and references to the single copy from the file entries that represent (possibly different) filenames associated with the entire content of that file. For example, a file entry in the file system structure would store: a single signature that is computed over the content of the entire file represented by that entry; and a reference to a location in the store structure where the file is stored. The store structure may be a regular file system, and the reference count associated with a file in the store structure reflects the number of file entries (in the file system structure) that represent the content of that file.

In these embodiments, suppose that in operation a sender (e.g., a client device) needs to store or upload a file to a de-duplicated repository that is managed by a receiver (e.g., a de-duplication server). The sender sends to the receiver a request to store the file, where the request includes a file ID (e.g., a filename) and a signature that is computed over the content of the entire file. In response to the request, the receiver checks to determine whether the file system structure stores a matching signature. If a matching signature is found, then the receiver stores in the file system structure a file entry with the received file ID and the signature, and increments the reference count of the file in the store structure that is associated with the matching signature. If a matching signature is not found in the file system structure, then the receiver requests the entire file from the sender, stores in the file system structure a file entry with the received file ID and the signature, stores the received file in the store structure, and initializes the reference count of the file in the store structure. When an application executing on the sender needs to receive or download the file form the de-duplicated repository, the sender sends to the receiver a request with the file ID. The receiver looks up the file ID in the file entries of the file system structure, and returns to the sender the signature from that one file entry which stores a matching file ID. Upon receipt of the signature, the sender looks up the signature in its sender repository to determine whether it stores a matching signature that identifies a file that has requested content (but possibly under a different filename). If a match for the signature is found, then the sender returns to the application the file (or a file handle thereto) that is identified by the matching signature (and performs any file renaming, if necessary). If a match for the signature is not found in the sender repository, the sender requests the entire file from the receiver, stores the file and the signature in its repository, and returns the file or a file handle thereto to the application.

According to the techniques described herein, the file system structure of a de-duplicated repository stores file entries that include the same filenames and partial metadata information as the original files represented by the file entries. In embodiments in which de-duplication is performed on the file level, a file entry in the file system structure additionally stores one signature that is computed over the content of the entire file represented by that file entry. In embodiments in which de-duplication is performed on the chunk level, a file entry in the file system structure additionally stores a list of N (N>=1) signatures with their offsets and lengths, where the N signatures identify the N chunks into which the file represented by that entry is broken down.

The structure of the de-duplicated repository described herein provides O(1) order of the search time for a signature. In some embodiments, the search time for a signature can cost up to 8 I/O operations (looking for directory on the disk), which may be problematic in operational contexts in which the searched-for chunks are frequently not found. In order to address this issue, the techniques described herein provide an improvement that can use memory-based least-recently-used (LRU) table (e.g., a map index from signature to path) or a negative-cache bitmap.

The idea behind using a negative cache is to avoid I/O operations for signatures that are not present in the de-duplicated repository. This would reduce the overhead of negative lookups (i.e. lookups for chunks that do not exist in the de-duplicated repository). In a negative-cache bitmap according to this idea, each bitmap entry is one bit and covers all signatures that start with any given N bits. For example, if N=16 is used, then a bitmap index of $2^{16}$ entries is needed. Thus, a bit corresponding to a certain value (e.g., 0×AA45) will cover all the signatures starting with that value (i.e., all signatures that start with 0×AA45), and the bit will be marked as "1" (dirty) if at least one such signature exist in covered set. In terms of scale, to support coverage of 4 billion covered sets, there will be a need for a bitmap of size $2^{32}$ bits (i.e., $2^{32}$ bits=512 MB) of memory.

In some embodiments, the negative-cache bitmap includes all possibilities of the most significant bits (MSB) of 3-4 bytes, which would consume about $2^{21}$-$2^{29}$ bytes of memory. A bit in the negative-cache bitmap will be set if at least one signature having bytes with matching most significant bits exists in the de-duplicated repository. Assuming statistic distribution of the signature function, this allows the system to scale up to $2^{30}$-$2^{32}$ different chunks without making the bitmap useless. In some embodiments, the negative-cache bitmap can be built in the background when the system starts or can be flushed to the disk from time to time.

4.2 Examples of End-to-End Data Transfer Logic

In some embodiments, the techniques for storage-network de-duplication described herein may provide two different mechanisms for transferring data—a synchronized mechanism and an un-synchronized mechanism. These two mechanisms are described hereinafter with respect to a sender and a receiver, where the sender is a client device and the receiver is a de-duplication server that manages a de-duplicated repository. It is noted however, that use of the client device as the "sender" and the de-duplication server as the "receiver" is purely for illustrative purposes, and the two mechanisms described hereinafter are not limited to being performed by senders and receivers of any particular type.

2-Pass Mechanism (Un-synchronized)

According to this data transfer mechanism, the repositories on the sender side and the receiver side are not synchronized. The mechanism includes the following steps:
1. Sender: the sender retrieves the list of signatures for the chunks of a file that is to be transferred, and sends the list of signatures to the receiver.
2. Receiver: the receiver looks up the list of signatures directly in the store structure of its de-duplicated repository. To improve the look-up performance, the receiver may first detect whether there are any duplicated signatures in the list.
3. Receiver: for chunks that are not stored in the store structure of the de-duplicated repository, the receiver requests from the sender these chunks as well as the metadata information (e.g., permissions, ACL, etc.) for the file.
4. Sender: the sender sends to the receiver the requested chunks and the metadata information.
5. Receiver:
    a. for each new chunk—the receiver stores the chunk under the chunk's signature in the store structure of the de-duplicated repository, initializes the chunk's reference counter to 1, and initializes the link to the store structure from the file system structure of the de-duplicated repository (e.g., stores the chunk signature or location pointer to the chunk in the corresponding file entry in the file system structure).
    b. for existing chunks—the receiver increments the reference counts associated with the already-stored chunks, and initializes the links to the store structure from the file system structure of the de-duplicated repository.
    c. for each deleted chunk—the receiver removes the link to that chunk from the file system structure of the de-duplicated repository, and decreases the reference count associated with the chunk; if the reference count becomes zero, then the receiver removes the chunk from the store structure.

1-Pass Mechanism (Synchronized)

According to this data transfer mechanism, the sender uses the same de-duplication scheme as the receiver, and the sender side and the receiver side repositories are synchronized. For example, the sender and the receiver may use the same de-duplication logic and may store synchronized versions of the same de-duplicated repository. The mechanism includes the following steps:
1. Sender: the sender computes the signatures for the chunks of a file that is to be transferred, and checks the store structure in its de-duplicated repository for any existing, already-stored signatures. The sender then stores in the store structure any new chunks and the signatures thereof that are not already stored therein, and makes the necessary updates to its file system structure.
2. Sender: the sender sends to the receiver the list of signatures that identify the chunks of the file as well as the content of any new chunks (since chunks that are new to the sender would also be new to the receiver). The sender may also send to the receiver the full or some partial metadata information associated with the file.
3. Receiver:
    a. for each new chunk—the receiver stores the chunk under the chunk's signature in the store structure of its de-duplicated repository, initializes the chunk's reference counter to 1, and initializes the link to the store structure from the file system structure of the de-duplicated repository (e.g., stores the chunk signature or location pointer to the chunk in the corresponding file entry in the file system structure).
    b. for existing chunks—the receiver increments the reference counts associated with the already-stored chunks, and initializes the links to the store structure from the file system structure of the de-duplicated repository.
    c. for each deleted chunk—the receiver removes the link to that chunk from the file system structure of the de-duplicated repository, and decreases the reference count associated with the chunk; if the reference count becomes zero, then the receiver removes the chunk from the store structure.

Example of the Data Transfer in Embodiments Using File-Level De-duplication

Described hereinafter is an example of end-to-end data transfers in embodiments that use file-level de-duplication. (It is noted that the sequence of interactions between the sender and the receiver in this example are equally applicable to embodiments that use chunk-level de-duplication.)
1. The sender needs to send to the receiver two files: A1 and A2.
2. The sender computes and sends to the receiver the following two file-level signatures: A1 has signature 0xFE, A2 has signature 0x2F.
3. The receiver does not initially have either file and, after receiving the signatures, the receiver requests both files with their respective metadata information. After receiving both files and the metadata information thereof, the receiver updates its de-duplicated repository with the following information:
A1→signature=0xFE, reference count=1
A2→signature=0x2F, reference count=1.
4. At some time thereafter, the sender needs to send to the receiver three new files: A3, B1, and B2.
5. The sender computes the following three file-level signatures: A3 has signature 0xFE, B1 and B2 have signatures 0x3C and appear to be copies of each other (including ACLs). The sender sends these three signatures to the receiver.
6. The receiver checks the received signatures in its de-duplicated repository, and finds signature 0xFE but does find signature 0x3C.
7. The receiver then requests from the sender the content of file B1 and the metadata information for file both file A3 and file B1. After receiving the requested data from the sender, the receiver updates its de-duplicated repository with the following information:
A1, A3→signature=0xFE, reference count=2
A2→signature=0x2F, reference count=1
B1, B2→signature=0x3C, reference count=2.

4.3 Examples of Signature Calculations

In some embodiments, the techniques for storage-network de-duplication described herein may use a fingerprinting logic that applies a Rabin polynomial function for determining chunk boundaries (e.g., anchor points) over the content of a file that needs to be de-duplicated. These embodiments may use a signature-generating logic that computes a 16-byte MD5 signature for each chunk that is delimited in the file by the fingerprinting logic. In addition, these embodiments may also use the signature-generating logic to compute a 16-byte file-level MD5 signature from the entire content of the file.

In some embodiments, the techniques described herein may be used to provide de-duplication at a file level instead of at a chunk level—in other words, these embodiments would de-duplicate entire files. These embodiments may use a signature-generating logic that computes a 16-byte MD5 signature for a file from the entire content of that file. In addition or instead of, these embodiments may use a signature-generating logic that computes a file signature that is the concatenation of a 16-byte MD5 signature and a 4-byte Cyclical Redundancy Check (CRC) (which can be computed by using the Adler-32 function or the Fletcher-32 function).

4.4 Disk Considerations and Optimizations

Since according to the techniques described herein the chunks stored in the de-duplicated repository have variable length, in some embodiments a store structure in the de-duplicated repository may use signature index files in order to avoid inefficient use of physical disk blocks. For example, in these embodiments the store structure may include one or more index files, where each index file stores: a set of related signatures such as, for example, the set of all signatures that have N-2 identical most significant bits (MSB); and an index table at the start of the file that indexes the stored signatures.

The effectiveness of such signature index files depends on the amount of chunk deletions that are performed in the de-duplicated repository. If chunk deletions are relatively rare, in some embodiments the signature index files stored in the store structure of the de-duplicated repository may have the structure illustrated in FIG. 4C.

Figure 4C:
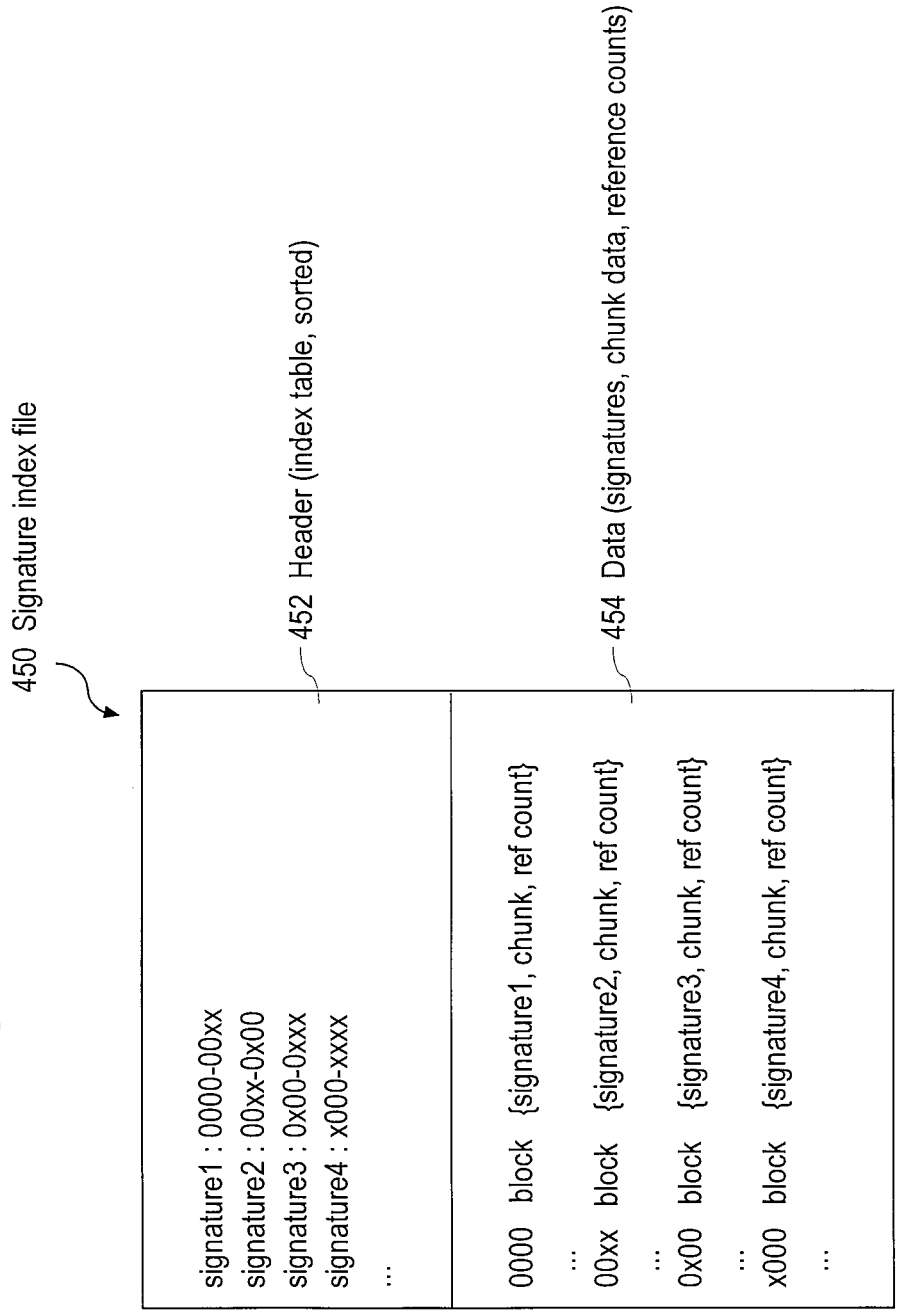
FIG. 4C is a block diagram that illustrates the structure of a signature index file that can be stored in the store structure of a de-duplicated repository according to one embodiment.

Referring to FIG. 4C, signature index file 450 comprises header portion 452 and data portion 454. Header portion 452 stores an index table that indexes the particular range of signatures that are stored in index file 450. For example, the particular range of signatures stored in index file 450 may include all signatures with hexadecimal values ranging from value "0x0000" to value "0x1FFF". The index table in the header portion 452 may be sorted by signature value in ascending order. For each signature, data portion 454 stores the actual signature, the chunk data identified by that signature, and the reference count associated with that chunk. Data portion 454 is organized in such a way that each data tuple of {signature, chunk, reference count} is stored in a physical disk block that is pointed to or referenced by the entry, in the index table in header 452, that corresponds to the signature.

It is noted that the index file structure illustrated in FIG. 4C may benefit from occasional defragmentation of the signature index file. For example, if the chunks and associated data thereof are changed more frequently, a fixed overhead per chunk may be used to avoid the need for frequent defragmentation of the index file. The range of chunk sizes may be divided into groups (up to 512 bytes, 512-1024 bytes, etc.), and chunks belonging to a given group size may be placed into a corresponding signature index file using fixed length. In this way, every deletion of a chunk from the index file may be easily reused for some other, newer chunk that belongs to the same group size. This group size technique may be used in embodiments in which the store structure of a de-duplicated repository is implemented as a logical structure that is stored within one or more files that are physically stored in a regular file system.

In some operational contexts, there may be scalability considerations that arise from various file system features such as, for example, the number of files allowed in a directory. To address these scalability considerations, some embodiments may implement the store structure of a de-duplicated repository as a logical structure that is stored within one or more files that are physically stored in a regular file system. In these embodiments, the techniques described herein provide for avoiding the various file system scalability features, while at the same time keeping low overhead for operations that create and delete entries in the store structure. For example, the techniques described herein may utilize an organization for the store structure that uses hierarchical levels as follows:

Store Structure
  0-11 most significant bits of the signature
    12-23 most significant bits of the signature
      other bits of the signature In the above store structure, the number of bits in each hierarchical level is dictated by the scalability characteristics of the underlying file system and by scalability characteristics for the store structure itself. In the specific example illustrated above, assuming that the underlying file system is efficient for 5000 files per directory, the total number of efficiently supported store structure entries will be $2^{12}*2^{12}*5000$ (or approximately 6 billion). In other words, in the specific example illustrated above, the store structure will be able to efficiently store approximately 6 billion chunks. It is noted that the hierarchical organization of the store structure illustrated above provides a constant order of O(1) for looking up a signature in the store structure in at most three steps.

In some operational contexts, another consideration may arise when a large number of small files need to be stored in the de-duplicated repository. To address this consideration, in some embodiments storing small files in the store structure of the de-duplicated repository may be entirely skipped. For example, in these embodiments files that have a size which is less than a defined threshold (e.g., a threshold that is in the order of the physical disk block size) may be stored directly in a regular file system that is part of the de-duplicated repository. (It is noted that this optimization may be implemented in embodiments in which the store structure of the de-duplicated repository is implemented as a logical structure on top of a regular file system.)

4.5 Metadata De-duplication

In some operational contexts, the techniques described herein may be used to de-duplicate file metadata information (e.g., ACLs, permissions, etc.) in a manner that is similar to how file content chunks are de-duplicated. For example, de-duplicating file metadata information may improve storage utilization in operational contexts in which a relatively large number of client devices store in the de-duplicated repository files that collectively have a relatively few distinct sets of metadata information. Thus, when the de-duplicated repository stores two or more files with different content but the same metadata information, only one set of the metadata information would be stored in the de-duplicated repository and the file entries for the two or more different files would simply have references (e.g., chunk signatures) to the chunk(s) in the de-duplicated repository that stores the shared metadata information.

To de-duplicate metadata information associated with a file in accordance with the techniques described herein, in some embodiments a de-duplication server may first request and receive the metadata information for the file from a client device that stores that information. Then, in the same way file content chunks are generated, the de-duplication server generates one or more chunks from the metadata information associated with the file. For example, the de-duplication server may apply to the metadata information the same fingerprinting logic that is used to break down the file into chunks. The de-duplication server then computes a list of one or more signatures for the one or more chunks into which the metadata information for the file has been broken down. The de-duplication server then stores, in the store structure of the de-duplicated repository, the list of signatures and the corresponding one or more chunks with metadata information in the same way file content chunks and the signatures thereof are stored. The de-duplication server also stores, in the file entry that represents the file in the file system structure of the de-duplicated repository, data that associates the file with the list of signatures for the chunks that store the metadata information for the file. Thus, the file entry that represents the file stores: a list of signatures that identify the chunks of the file; and a list of one or more signatures that identify one or more chunks that store the metadata information for the file. In this manner, the storage-network de-duplication techniques described herein may be used to de-duplicate file metadata information in order to attain even better storage utilization.

4.6 On-the-fly Computation of File-Level Signatures

In some embodiments, the techniques for storage-network de-duplication described herein may use file-level signatures such as, for example, MD5 signatures that are computed from the entire content of the file. Since computing a file-level signature is a computationally expensive operation (especially for large files), in these embodiments the techniques described herein may provide a mechanism for on-the-fly computation of the file-level signature as the file is being de-duplicated for storing in a de-duplicated repository, so once file is stored there is no need to assemble, re-open, or re-read the file for the purpose of computing the file-level signature thereof.

For example, in these embodiments a de-duplication server may receive (e.g., from a data center management application) a new file that is to be stored in the de-duplicated repository for the very first time. The de-duplication server first stores (or accesses) the new file in temporary storage such as, for example, a temporary directory in a regular file system. Concurrently with de-duplicating and storing the new file in the de-duplicated repository in accordance with the techniques described herein, the de-duplication server computes on-the-fly a file-level signature from the new file as chunks of the new file are being processed for storing in the de-duplicated repository. For example, the de-duplication server may execute a fingerprinting logic to break down the new file into chunks and a signature-generating logic to compute a signature for each chunk; so, as the new file is being traversed, the de-duplication server or a component thereof (e.g., a instance of the signature-generating logic) computes on-the-fly a file-level signature from the entire content of the new file. Thus, when the de-duplication operation on the new file is completed and the new file on the temporary storage is closed, the file-level signature for the new file is already computed and the de-duplication server does not need to re-open, re-traverse, or otherwise access the new file in the temporary storage for the purpose of computing a file-level signature. Thus, after the new file is de-duplicated and stored in the de-duplicated repository, the de-duplication server is able to store the file-level signature of the new file in the de-duplicated repository without further accessing or opening the copy of the new file in the temporary storage.

The on-the-fly computation of file-level signatures described herein may also be performed by a client device when the client device breaks down a new file into chunks for the first time. For example, a de-duplication logic on the client device may include or have access to a driver that intercepts file write operations to the regular file system on the client device where, in addition to storage-network de-duplicating a new file, the de-duplication logic and/or the driver may also be configured to compute on-the-fly a file-level signature of the file.

It is noted that the mechanism for on-the-fly computation of file-level signatures described herein speeds up the processing and de-duplication of a file a lot because the file-level signature of the file is being computed as the file is being written—thus, if the file is very large, the mechanism described herein completely avoids the computationally expensive operations to re-access and/or re-read the file after the application that created the file is closed.

5.0 Implementation Mechanisms—Hardware Overview

According to one embodiment, the techniques for storage-network de-duplication described herein are implemented by one or more special-purpose computing devices. The special-purpose computing devices may be hard-wired to perform the techniques, or may include digital electronic devices such as one or more application-specific integrated circuits (ASICs)

or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
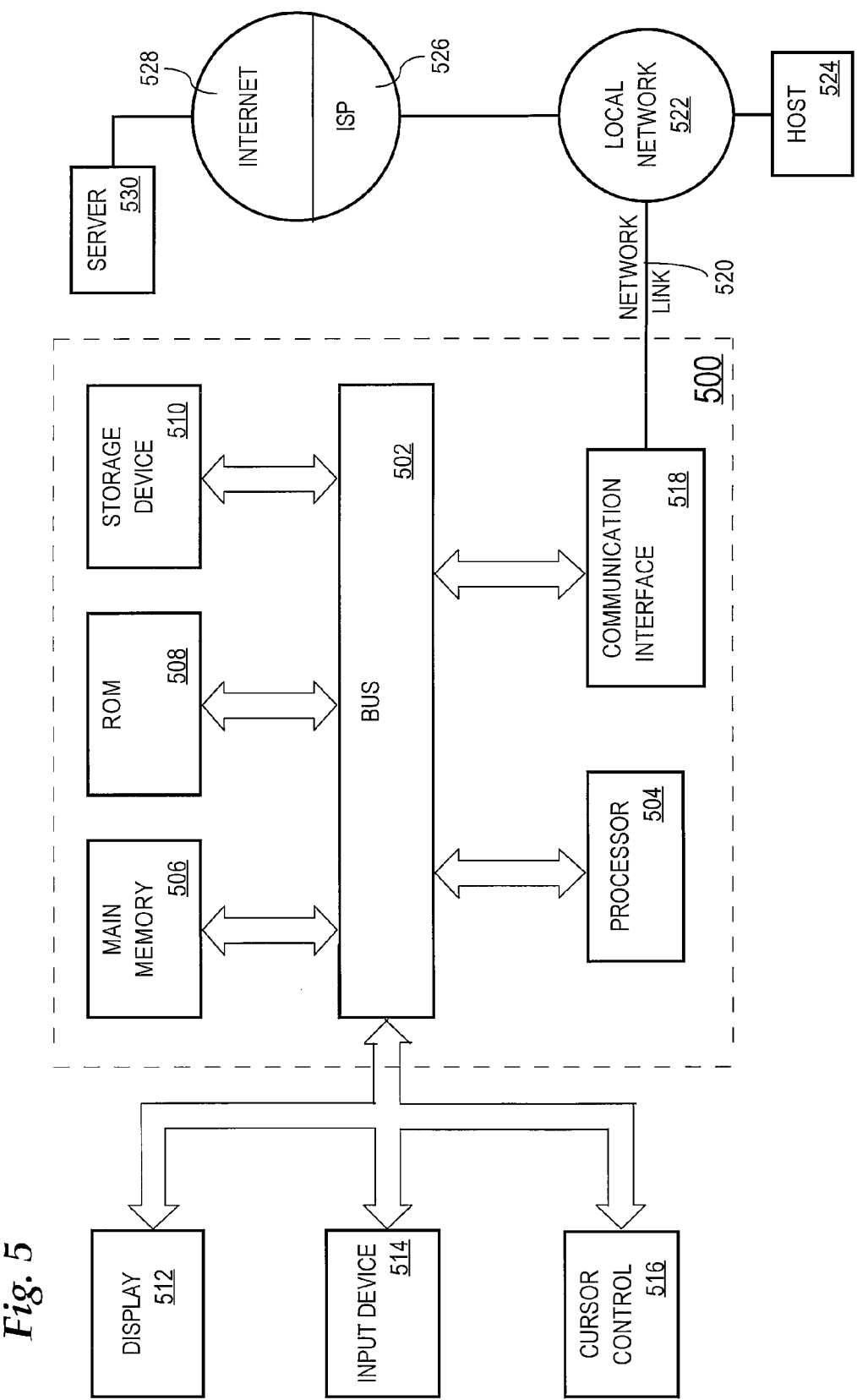
FIG. 5 is a block diagram that illustrates an example computer system on which embodiments may be implemented.

For example, FIG. 5 is a block diagram that illustrates a computer system 500 upon which an embodiment of the techniques described herein may be implemented. Computer system 500 includes a bus 502 or other communication mechanism for communicating information, and one or more hardware processors 504 coupled with bus 502 for processing information. Hardware processor(s) 504 may be, for example, a general purpose microprocessor.

Computer system 500 also includes a main memory 506, such as a random access memory (RAM) or other dynamic storage device, coupled to bus 502 for storing information and instructions to be executed by processor(s) 504. Main memory 506 also may be used for storing temporary variables or other intermediate information during execution of instructions to be executed by processor(s) 504. Such instructions, when stored in storage media accessible to processor(s) 504, render computer system 500 into a special-purpose machine that is customized to perform the operations specified in the instructions.

Computer system 500 further includes a read only memory (ROM) 508 or other static storage device coupled to bus 502 for storing static information and instructions for processor(s) 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor(s) 504. Another type of user input device is cursor control 516, such as a mouse, a trackball, or cursor direction keys for communicating direction information and command selections to processor(s) 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques for storage-network de-duplication described herein using customized hard-wired logic, one or more ASICs or FPGAs, firmware and/or program logic which in combination with the computer system causes or programs computer system 500 to be a special-purpose machine. According to one embodiment, the techniques described herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "storage media" as used herein refers to any media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor(s) 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor(s) 504 retrieves and executes the instructions. The instructions received by main memory 506 may optionally be stored on storage device 510 either before or after execution by processor(s) 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor(s) 504 as it is received, and/or stored in storage device 510, or other non-volatile storage for later execution.

6.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A system comprising:
   one or more processors;
   a de-duplicated repository of a storage management system, coupled to the one or more processors; and
   a de-duplication logic of the storage management system, coupled to the one or more processors and to the de-duplicated repository, wherein the de-duplication logic is operable to store files in the de-duplicated repository using a single storage encoding and to:
      receive, from a client device over a network, a first request to store a file in the de-duplicated repository, wherein the first request includes an identifier of the file and a set of signatures that respectively identify a set of chunks from the file, wherein the client device is remote from the storage management system;
      look up the set of signatures in the de-duplicated repository to determine whether any chunks in the set of chunks are not stored in the de-duplicated repository;
      request, from the client device, those chunks from the set of chunks that are not stored in the de-duplicated repository;
      for each chunk from the set of chunks that is not stored in the de-duplicated repository, store in the de-duplicated repository using the single storage encoding at least the chunk and a signature, from the set of signatures, that represents the chunk; and
      store, in the de-duplicated repository, a file entry that represents the file and that associates the set of signatures with the identifier of the file,
   wherein the de-duplicated repository is stored on physical disk blocks that have a fixed size, and wherein the set of chunks are generated using a fingerprinting logic that is configured to generate variable-sized chunks in a manner that is dependent on the fixed size, such that each variable-sized chunk is no larger than the fixed size.

2. The system as recited in claim 1, wherein the de-duplication logic is further operable to:
   receive, from the client device over the network, a second request to download the file, wherein the second request includes the identifier of the file;
   look up the identifier of the file in the de-duplicated repository to determine the file entry;
   based on the file entry, retrieve the set of signatures that are associated with the identifier of the file, but not data from the file; and
   in response to the second request, send the set of signatures but not the file to the client device over the network.

3. The system as recited in claim 2, wherein the de-duplication logic is further operable to:
   receive a third request from the client device over the network, wherein the third request includes one or more signatures that respectively identify one or more chunks that are not stored at the client device;
   look up the one or more signatures in the de-duplicated repository to determine the one or more chunks identified in the third request; and
   send the one or more chunks identified in the third request to the client device over the network.

4. The system as recited in claim 1, wherein the de-duplication logic is further operable to:
   increment first one or more reference counts that are respectively associated with those first one or more chunks, from the set of chunks, that were already stored in the de-duplicated repository; and
   initialize second one or more reference counts that are respectively associated with those second one or more chunks, from the set of chunks, that were not previously stored in the de-duplicated repository.

5. The system as recited in claim 1, wherein the set of chunks have varying lengths, and wherein the fingerprinting logic determines chunk boundaries based on the content of the file.

6. The system as recited in claim 1, wherein the de-duplicated repository comprises a file system structure and a store structure, wherein the file system structure is configured to store the identifier of the file and the file entry, and wherein the store structure is configured to store the set of signatures and the set of chunks.

7. The system as recited in claim 6, wherein the de-duplication logic is further operable to:
   generate one or more metadata chunks for the file by applying the fingerprinting logic to metadata information associated with the file;
   compute one or more metadata signatures respectively for the one or more metadata chunks;
   store, in the store structure, the one or more metadata chunks and the one or more metadata signatures; and
   store, in the file entry that represents the file in the file system structure, data that associates the one or more metadata signatures with the identifier of the file.

8. The system as recited in claim 6, wherein the store structure is organized in a plurality of hierarchical levels, and wherein signatures at each of the hierarchical levels are keyed based on a subset of the signatures' bits.

9. The system as recited in claim 6, wherein the de-duplication logic further includes a programming interface that is operable to look up signatures directly into the store structure to find corresponding chunks.

10. The system as recited in claim 1, wherein the de-duplication logic is further operable to:
   receive a second request from the client device over the network, wherein the second request includes a list of signatures that identify a plurality of chunks that need to be sent to the client device;
   based on the list of signatures, determine a list of block identifiers of a plurality of physical disk blocks on which the plurality of chunks are stored;

sort the list of block identifiers; and retrieve the plurality of chunks by accessing the plurality of physical disk blocks in the order indicated by the sorted list of block identifiers.

11. The system as recited in claim 1, wherein the de-duplication logic is operable to determine whether any chunks in the set of chunks are not stored in the de-duplicated repository by looking up the set of signatures in a negative-cache bitmap.

12. The system as recited in claim 1, wherein the de-duplication logic is further operable to:

receive a new file for storing into the de-duplicated repository;

store the new file in temporary storage;

concurrently with storing the new file in the de-duplicated repository using the single storage encoding, compute on-the-fly a file-level signature from the new file as chunks of the new file are being processed for storing in the de-duplicated repository; and after the new file is stored in the de-duplicated repository, store the file-level signature in the de-duplicated repository without accessing the new file in the temporary storage.

13. The system as recited in claim 1, wherein the de-duplication logic is further operable to, prior to receiving the first request to store the file:

receive, from the client device, the identifier of the file and a file-level signature that identifies the file;

look up the file-level signature in the de-duplicated repository;

if a match for the file-level signature is found, then store the file entry that represents the file in the de-duplicated repository, wherein the file entry associates the file-level signature with the identifier of the file; and if a match for the file-level signature is not found, then send a request to the client device requesting that the client device send the first request.

14. The system as recited in claim 1, wherein the de-duplication logic is further operable to:

receive, from the client device over the network, a second request to download the file, wherein the second request includes the identifier of the file;

look up the identifier of the file in the de-duplicated repository to determine the file entry;

based on the file entry, retrieve a file-level signature that is associated with the identifier of the file, but not data from the file; and in response to the second request, send the file-level signature but not the file to the client device over the network, wherein the download of the file is completed if the client device finds a match for the file-level signature in a local repository that stores file-level signatures and associates the file-level signatures with files stored on the client device.

15. One or more non-transitory storage media storing instructions executable by one or more computing devices, the instructions comprising:

instructions that cause the one or more computing devices to receive, from a client device over a network, a first request to store a file in a de-duplicated repository of a storage management system, using a single storage encoding, wherein the first request includes an identifier of the file and a set of signatures that respectively identify a set of chunks from the file, wherein the client device is remote from the storage management system;

instructions that cause the one or more computing devices to look up the set of signatures in the de-duplicated repository to determine whether any chunks in the set of chunks are not stored in the de-duplicated repository;

instructions that cause the one or more computing devices to request, from the client device, those chunks from the set of chunks that are not stored in the de-duplicated repository;

for each chunk from the set of chunks that is not stored in the de-duplicated repository, instructions that cause the one or more computing devices to store in the de-duplicated repository using the single storage encoding at least the chunk and a signature, from the set of signatures, that represents the chunk; and instructions that cause the one or more computing devices to store, in the de-duplicated repository, a file entry that represents the file and that associates the set of signatures with the identifier of the file, wherein the de-duplicated repository is stored on physical disk blocks that have a fixed size, and wherein the set of chunks are generated using a fingerprinting logic that is configured to generate variable-sized chunks in a manner that is dependent on the fixed size, such that each variable-sized chunk is no larger than the fixed size.

16. The one or more non-transitory storage media as recited in claim 15, wherein the instructions further comprise:

instructions that cause the one or more computing devices to receive, from the client device over the network, a second request to download the file, wherein the second request includes the identifier of the file;

instructions that cause the one or more computing devices to look up the identifier of the file in the de-duplicated repository to determine the file entry;

instructions that cause the one or more computing devices to retrieve, based on the file entry, the set of signatures that are associated with the identifier of the file, but not data from the file; and instructions that cause the one or more computing devices to send, in response to the second request, the set of signatures but not the file to the client device over the network.

17. The one or more non-transitory storage media as recited in claim 16, wherein the instructions further comprise:

instructions that cause the one or more computing devices to receive a third request from the client device over the network, wherein the third request includes one or more signatures that respectively identify one or more chunks that are not stored at the client device;

instructions that cause the one or more computing devices to look up the one or more signatures in the de-duplicated repository to determine the one or more chunks identified in the third request; and instructions that cause the one or more computing devices to send the one or more chunks identified in the third request to the client device over the network.

18. The one or more non-transitory storage media as recited in claim 15, wherein the instructions further comprise:

instructions that cause the one or more computing devices to increment first one or more reference counts that are respectively associated with those first one or more chunks, from the set of chunks, that were already stored in the de-duplicated repository; and instructions that cause the one or more computing devices to initialize second one or more reference counts that are respectively associated with those second one or more chunks, from the set of chunks, that were not previously stored in the de-duplicated repository.

19. The one or more non-transitory storage media as recited in claim 15, wherein the set of chunks have varying lengths, and wherein the fingerprinting logic determines chunk boundaries based on the content of the file.

20. The one or more non-transitory storage media as recited in claim 15, wherein the de-duplicated repository comprises a file system structure and a store structure, wherein the file system structure is configured to store the identifier of the file and the file entry, and wherein the store structure is configured to store the set of signatures and the set of chunks.

21. The one or more non-transitory storage media as recited in claim 20, wherein the instructions further comprise:
   instructions that cause the one or more computing devices to generate one or more metadata chunks for the file by applying the fingerprinting logic to metadata information associated with the file;
   instructions that cause the one or more computing devices to compute one or more metadata signatures respectively for the one or more metadata chunks;
   instructions that cause the one or more computing devices to store, in the store structure, the one or more metadata chunks and the one or more metadata signatures; and
   instructions that cause the one or more computing devices to store, in the file entry that represents the file in the file system structure, data that associates the one or more metadata signatures with the identifier of the file.

22. The one or more non-transitory storage media as recited in claim 20, wherein the store structure is organized in a plurality of hierarchical levels, and wherein signatures at each of the hierarchical levels are keyed based on a subset of the signatures' bits.

23. The one or more non-transitory storage media as recited in claim 20, wherein the instructions further comprise instructions that cause the one or more computing devices to provide a programming interface that is operable to look up signatures directly into the store structure to find corresponding chunks.

24. The one or more non-transitory storage media as recited in claim 15, wherein the instructions further comprise:
   instructions that cause the one or more computing devices to receive a second request from the client device over the network, wherein the second request includes a list of signatures that identify a plurality of chunks that need to be sent to the client device;
   instructions that cause the one or more computing devices to determine, based on the list of signatures, a list of block identifiers of a plurality of physical disk blocks on which the plurality of chunks are stored;
   instructions that cause the one or more computing devices to sort the list of block identifiers; and
   instructions that cause the one or more computing devices to retrieve the plurality of chunks by accessing the plurality of physical disk blocks in the order indicated by the sorted list of block identifiers.

25. The one or more non-transitory storage media as recited in claim 15, wherein the instructions further comprise instructions that cause the one or more computing devices to determine whether any chunks in the set of chunks are not stored in the de-duplicated repository by looking up the set of signatures in a negative-cache bitmap.

26. The one or more non-transitory storage media as recited in claim 15, wherein the instructions further comprise:
   instructions that cause the one or more computing devices to receive a new file for storing into the de-duplicated repository;
   instructions that cause the one or more computing devices to store the new file in temporary storage;
   concurrently with storing the new file in the de-duplicated repository using the single storage encoding, instructions that cause the one or more computing devices to compute on-the-fly a file-level signature from the new file as chunks of the new file are being processed for storing in the de-duplicated repository; and
   after the new file is stored in the de-duplicated repository, instructions that cause the one or more computing devices to store the file-level signature in the de-duplicated repository without accessing the new file in the temporary storage.

27. The one or more non-transitory storage media as recited in claim 15, wherein the instructions further comprise, prior to receiving the first request to store the file:
   instructions that cause the one or more computing devices to receive, from the client device, the identifier of the file and a file-level signature that identifies the file;
   instructions that cause the one or more computing devices to look up the file-level signature in the de-duplicated repository;
   if a match for the file-level signature is found, instructions that cause the one or more computing devices to store the file entry that represents the file in the de-duplicated repository, wherein the file entry associates the file-level signature with the identifier of the file; and
   if a match for the file-level signature is not found, instructions that cause the one or more computing devices to send a request to the client device requesting that the client device send the first request.

28. The one or more non-transitory storage media as recited in claim 15, wherein the instructions further comprise:
   instructions that cause the one or more computing devices to receive, from the client device over the network, a second request to download the file, wherein the second request includes the identifier of the file;
   instructions that cause the one or more computing devices to look up the identifier of the file in the de-duplicated repository to determine the file entry;
   instructions that cause the one or more computing devices to retrieve, based on the file entry, a file-level signature that is associated with the identifier of the file, but not data from the file; and
   instructions that cause the one or more computing devices to send, in response to the second request, the file-level signature but not the file to the client device over the network,
   wherein the download of the file is completed if the client device finds a match for the file-level signature in a local repository that stores file-level signatures and associates the file-level signatures with files stored on the client device.

29. A method comprising:
   receiving, from a client device over a network, a first request to store a file in a de-duplicated repository of a storage management system, using a single storage encoding, wherein the first request includes an identifier of the file and a set of signatures that respectively identify a set of chunks from the file, and wherein the client device is remote from the storage management system;
   looking up the set of signatures in the de-duplicated repository to determine whether any chunks in the set of chunks are not stored in the de-duplicated repository;
   requesting, from the client device, those chunks from the set of chunks that are not stored in the de-duplicated repository;

for each chunk from the set of chunks that is not stored in the de-duplicated repository, storing in the de-duplicated repository using the single storage encoding at least the chunk and a signature, from the set of signatures, that represents the chunk; and storing, in the de-duplicated repository, a file entry that represents the file and that associates the set of signatures with the identifier of the file, wherein the de-duplicated repository is stored on physical disk blocks that have a fixed size, and wherein the set of chunks are generated using a fingerprinting logic that is configured to generate variable-sized chunks in a manner that is dependent on the fixed size, such that each variable-sized chunk is no larger than the fixed size.

30. The method of claim 29, further comprising:
receiving, from the client device over the network, a second request to download the file, wherein the second request includes the identifier of the file;
looking up the identifier of the file in the de-duplicated repository to determine the file entry;
based on the file entry, retrieving the set of signatures that are associated with the identifier of the file, but not data from the file; and
in response to the second request, sending the set of signatures but not the file to the client device over the network.

31. The method of claim 30, further comprising:
receiving a third request from the client device over the network, wherein the third request includes one or more signatures that respectively identify one or more chunks that are not stored at the client device;
looking up the one or more signatures in the de-duplicated repository to determine the one or more chunks identified in the third request; and
sending the one or more chunks identified in the third request to the client device over the network.

32. The method of claim 29, further comprising:
incrementing first one or more reference counts that are respectively associated with those first one or more chunks, from the set of chunks, that were already stored in the de-duplicated repository; and
initializing second one or more reference counts that are respectively associated with those second one or more chunks, from the set of chunks, that were not previously stored in the de-duplicated repository.

33. The system of claim 1, wherein the fingerprinting logic is configured to generate the variable-sized chunks in a manner that is further dependent on a predetermined overhead amount for each physical disk block, such that each variable-sized chunk is no larger than the fixed size minus the predetermined overhead amount.

* * * * *